(12) United States Patent
Fujioka et al.

(10) Patent No.: US 8,667,058 B2
(45) Date of Patent: Mar. 4, 2014

(54) TRANSFER APPARATUS, TRANSFER NETWORK SYSTEM, AND TRANSFER METHOD

(75) Inventors: Shinya Fujioka, Kawasaki (JP); Yoshihiro Ashi, Yokohama (JP); Masahiko Mizutani, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 60 days.

(21) Appl. No.: 13/527,311

(22) Filed: Jun. 19, 2012

(65) Prior Publication Data

US 2012/0331043 A1    Dec. 27, 2012

(30) Foreign Application Priority Data

Jun. 23, 2011 (JP) ................. 2011-139146

(51) Int. Cl.
*G06F 15/16* (2006.01)
(52) U.S. Cl.
USPC ........... 709/203; 709/217; 709/219; 375/351; 375/356; 455/503
(58) Field of Classification Search
USPC .................. 709/203, 217, 219; 375/356, 351; 455/503
See application file for complete search history.

(56) References Cited

U.S. PATENT DOCUMENTS

| | | | | |
|---|---|---|---|---|
| 5,327,468 A * | 7/1994 | Edblad et al. | ................. | 375/356 |
| 5,719,786 A * | 2/1998 | Nelson et al. | ................. | 709/219 |
| 5,842,134 A * | 11/1998 | Brown et al. | ................. | 455/503 |
| 6,223,286 B1 | 4/2001 | Hashimoto | | |
| 7,003,059 B1 * | 2/2006 | Susnow et al. | ................. | 375/351 |
| 2002/0194301 A1 * | 12/2002 | Morii et al. | ................. | 709/217 |
| 2009/0249222 A1 * | 10/2009 | Schmidt et al. | ................. | 715/751 |
| 2011/0238495 A1 * | 9/2011 | Kang | ................. | 705/14.49 |
| 2012/0331043 A1 * | 12/2012 | Fujioka et al. | ................. | 709/203 |

FOREIGN PATENT DOCUMENTS

| | | |
|---|---|---|
| JP | 10-032573 A | 2/1998 |
| JP | 2000-187629 | 7/2000 |
| JP | 2003-186777 A | 7/2003 |
| JP | 2006-074109 | 3/2006 |

* cited by examiner

*Primary Examiner* — Tammy Nguyen
(74) *Attorney, Agent, or Firm* — McDermott Will & Emery LLP

(57) ABSTRACT

When data is disclosed to a plurality of users by using a transfer network and a transfer apparatus, data disclosure time control which cannot be adversely affected by the users is performed to reduce the difference in data disclosure time among the users. A transfer network system includes a distribution server serving as a data-distribution-source transfer apparatus, and a network terminal connected to distribution-destination user equipment. The distribution server and the network terminal each have a time keeping function and a time synchronization function for matching the time of the time keeping function with a master clock. The distribution server sends in advance disclosure data and disclosure time to the network terminal. When the time of the time keeping function of the network terminal matches the disclosure time, the network terminal sends the disclosure data to the user equipment.

15 Claims, 22 Drawing Sheets

| DISCLOSURE TIME | DISTRIBUTION TIME | DISCLOSURE DATA | | |
|---|---|---|---|---|
| | | ID | TYPE | DATA |
| 2011/5/10 11:00:00 | 2011/5/10 10:50:00 | 100 | STOCK PRICE OF COMPANY A | DATA STRING A |
| 2011/5/10 11:05:00 | 2011/5/10 10:55:00 | 101 | NEWS ABOUT COMPANY B | DATA STRING B |
| 2011/5/10 13:30:00 | 2011/5/10 13:20:00 | 102 | STOCK PRICE OF COMPANY C | DATA STRING C |
| 2011/5/10 14:00:00 | 2011/5/10 13:30:00 | 103 | NEWS ABOUT INDUSTRY D | DATA STRING D |
| ... | ... | ... | ... | ... |

FIG.14

| DISCLOSURE TIME | DISTRIBUTION TIME | DISCLOSURE DATA | | | DESTINATION NETWORK TERMINAL |
|---|---|---|---|---|---|
| | | ID | TYPE | DATA | |
| 2011/5/10 11:00:00 | 2011/5/10 10:50:00 | 100 | STOCK PRICE OF COMPANY A | DATA STRING A | 120-1 |
| | | | | | 120-2 |
| | | | | | 120-3 |
| | | | | | 120-4 |
| | | | | | 120-5 |
| 2011/5/10 11:05:00 | 2011/5/10 10:55:00 | 101 | NEWS ABOUT COMPANY B | DATA STRING B | 120-1 |
| | | | | | 120-3 |
| | | | | | 120-5 |
| 2011/5/10 13:30:00 | 2011/5/10 13:20:00 | 102 | STOCK PRICE OF COMPANY C | DATA STRING C | 120-2 |
| | | | | | 120-4 |
| | | | | | 120-n |
| 2011/5/10 14:00:00 | 2011/5/10 13:30:00 | 103 | NEWS ABOUT INDUSTRY D | DATA STRING D | 120-3 |
| | | | | | 120-4 |
| | | | | | 120-5 |
| ... | ... | ... | ... | ... | ... |

| DISCLOSURE TIME | DISCLOSURE DATA ||| |
| --- | --- | --- | --- | --- |
| | ID | TYPE | DATA | |
| 2011/5/10 11:00:00 | 100 | STOCK PRICE OF COMPANY A | DATA STRING A | ... |
| 2011/5/10 11:05:00 | 101 | NEWS ABOUT COMPANY B | DATA STRING B | ... |
| ... | | | | |

| DISCLOSURE TIME | DISTRIBUTION TIME | DISCLOSURE DATA ||| DESTINATION NETWORK TERMINAL | RECEPTION RESPONSE | NUMBER OF ALLOWED RETRY PROCESSES | NUMBER OF RETRY PROCESSES |
|---|---|---|---|---|---|---|---|---|
| | | ID | TYPE | DATA | | | | |
| 2011/5/10 11:00:00 | 2011/5/10 10:50:00 | 100 | STOCK PRICE OF COMPANY A | DATA STRING A | 120-1 | NORMAL | 3 | 0 |
| | | | | | 120-2 | UNRECEIVED | | |
| | | | | | 120-3 | UNRECEIVED | | |
| | | | | | 120-4 | UNRECEIVED | | |
| | | | | | 120-5 | UNRECEIVED | | |
| 2011/5/10 11:05:00 | 2011/5/10 10:55:00 | 101 | NEWS ABOUT COMPANY B | DATA STRING B | 120-1 | UNRECEIVED | 2 | 1 |
| | | | | | 120-3 | UNRECEIVED | | |
| | | | | | 120-5 | UNRECEIVED | | |
| 2011/5/10 13:30:00 | 2011/5/10 13:20:00 | 102 | STOCK PRICE OF COMPANY C | DATA STRING C | 120-2 | UNRECEIVED | 3 | 0 |
| | | | | | 120-4 | UNRECEIVED | | |
| | | | | | 120-n | UNRECEIVED | | |
| 2011/5/10 14:00:00 | 2011/5/10 13:30:00 | 103 | NEWS ABOUT COMPANY D | DATA STRING D | 120-3 | UNRECEIVED | 2 | 0 |
| | | | | | 120-4 | UNRECEIVED | | |
| | | | | | 120-5 | UNRECEIVED | | |
| ... | ... | ... | ... | ... | ... | ... | ... | ... |

| DISCLOSURE TIME | PROCESSING EXECUTION FLAG | DISCLOSURE DATA | | |
|---|---|---|---|---|
| | | ID | TYPE | DATA |
| 2011/5/10 11:00:00 | SET | 100 | STOCK PRICE OF COMPANY A | DATA STRING A |
| 2011/5/10 11:05:00 | UNSET | 101 | NEWS ABOUT COMPANY B | DATA STRING B |
| ... | ... | ... | ... | ... |

1201

TRANSFER APPARATUS, TRANSFER NETWORK SYSTEM, AND TRANSFER METHOD

CLAIM OF PRIORITY

The present application claims priority from Japanese patent application JP 2011-139146 filed on Jun. 23, 2011, the content of which is hereby incorporated by reference into this application.

BACKGROUND OF THE INVENTION

1. Field of the Invention

The present invention relates to transfer apparatuses, transfer network systems, and transfer methods, and more particularly, to a transfer apparatus, a transfer network system, and a transfer method that are provided with a function to disclose data to a plurality of uses at the same time.

2. Description of the Related Art

Information transfer with the use of transfer networks, such as the Internet and leased lines, has been widely used in recent years also in economic activities including commerce. When important data is disclosed to users, such as news that can affect economic activities and an authentication key used to start a transaction, it is demanded that the differences in data disclosure time among users be reduced to increase fairness.

Methods aiming at simultaneous data disclosure in conventional general transfer networks include a method for distributing data simultaneously at certain time from a server in push technology service. It is not fair, however, because the time when each user receives the data greatly differs depending on the congestion states of transfer networks. In pull technology service, which discloses data in response to a request sent from a user, a method is used in which a server is made available to respond to a data disclosure request at certain time. It is advantageous, however, for a user closer to the server and using a larger-capacity transfer network because the user can perform more request trials within a given period of time.

A technology for reducing the differences in data disclosure time among users is disclosed in Japanese Unexamined Patent Application Publication No. 2000-187629 (Patent literature 1). This publication discloses in its abstract "Object: To provide a data distribution service that strictly guarantees a data transfer time for each user. Solving means: A distribution side formed of an IP server W and a gateway server GWS, or formed of a gateway server GWS only transmits an electronic mail in which the text is associated with the transfer time when the text is transferred to the transmission destination user; and a mobile terminal MS at the receiving side receives the text and the transfer time sent from the distribution side and controls the start of processing for the text (for example, display processing of the text) according to the transfer time and the current time. With this configuration, control is possible at the receiving side such that the processing for the text is not performed until the transfer time or the processing for the text is started at the transfer time."

Another technology is disclosed in Japanese Unexamined Patent Application Publication No. 2006-74109 (Patent literature 2). This publication discloses in its abstract "Object: To eliminate unfairness among users by disclosing data simultaneously to users with the use of general-purpose hardware, software, and networks. Solving means: An additional software execution section 103 is provided between a browser 106 and a network 107. The additional software execution section 103 includes an additional software internal timer function section 104 and establishes first and second unicast connections 108 and 109 with a server 101. The additional software execution section transmits a data distribution request from the browser to the server at a predetermined time (152); receives distribution data from the server through the first unicast connection and temporarily stores the distribution data (154); sets a server time and a distribution data disclosure time sent from the server through the second unicast connection, in the additional software internal timer function section (154); and sends the distribution data to the browser at the set disclosure time (155).

The Network Time Protocol (NTP) and the Precision Time Protocol (PTP) version 2 in IEEE 1588 are known as technologies for synchronizing the time of apparatuses in a transfer network. Either of the technologies stipulates a time synchronization system between a server that provides a stable time and a client that follows the server time. The time synchronization precision depends on implementation systems, but it is said that the NTP provides millisecond order precision and the PTP version 2 in IEEE 1588 provides microsecond order precision.

SUMMARY OF THE INVENTION

When data that has a great meaning in economic activities is disclosed to a plurality of users simultaneously by using a transfer network and a transfer apparatus, it is demanded that the differences in data disclosure time among the users be reduced to increase fairness.

Patent literature 1 and Patent literature 2 are known as technologies for reducing the differences in data disclosure time among users. However, since Patent literature 1 does not describe time synchronization control between a mobile terminal performing transfer control based on transfer time and another mobile terminal, synchronization precision, which directly affects the differences in data disclosure time among the users, is not clear. If the user changes the current time of a mobile terminal, he or she can receive disclosure data earlier than the other users. Patent literature 2 describes a time synchronization system between a server and a client. When the client receives information that includes the server current time, the additional software internal timer in the client is set to the received server current time. The time synchronization precision among clients depends on the differences in data transfer time from the server among the clients. Since the software controls data disclosure after the client receives the data, the data may be glanced earlier than the set data disclosure time.

Accordingly, it is an object of the present invention to reduce the differences in data disclosure time among users to increase fairness when data is disclosed to a plurality of users by using a transfer network and a transfer apparatus. Another object is to provide a high-precision data disclosure time control system by combining a high-precision (microsecond order) time synchronization system and data disclosure control. Still another object is to provide a system in which users cannot adversely affect data disclosure time control.

To solve the above-described problems, the present invention provides, in one aspect, a transfer network system that includes a distribution server serving as a data-distribution-source transfer apparatus, and a user-side transfer apparatus connected to distribution-destination user equipment. The distribution server and the user-side transfer apparatus each have a time keeping function and a time synchronization function for matching the time of the time keeping function with a master clock. The distribution server sends in advance disclosure data and disclosure time to the user-side transfer apparatus. When the time of the time keeping function of the user-side transfer apparatus matches the disclosure time, the user-side transfer apparatus sends the disclosure data to the user equipment.

According to the first solving means of the present invention, there is provided a transfer network system comprising:
 a distribution server serving as a data distribution source transfer apparatus; and
 a user-side transfer apparatus connected to distribution-destination user equipment;
  the distribution server comprising:
  a distribution data table that stores disclosure data, disclosure time, and distribution time in association with each other; and
  a first time keeping function and a first time synchronization function for matching the time of the first time keeping function with a master clock;
  the user-side transfer apparatus comprising:
  a disclosure data table that stores disclosure data and disclosure time in association with each other; and
  a second time keeping function and a second time synchronization function for matching the time of the second time keeping function with the master clock;
  wherein
  the distribution server referring to the time of the first time keeping function and the distribution data table to send in advance the disclosure data and the disclosure time at the distribution time to the user-side transfer apparatus;
  the user-side transfer apparatus storing the disclosure data and the disclosure time received from the distribution server, in the disclosure data table; and
  the user-side transfer apparatus referring to the disclosure data table to send the disclosure data to the user equipment when the time of the second time keeping function matches the disclosure time.

According to the second solving means of the present invention, there is provided a transfer method in a transfer network system comprising:
 a distribution server serving as a data distribution source transfer apparatus; and
 a user-side transfer apparatus connected to distribution-destination user equipment;
  the distribution server comprising:
  a distribution data table that stores disclosure data, disclosure time, and distribution time in association with each other; and
  a first time keeping function and a first time synchronization function for matching the time of the first time keeping function with a master clock;
  the user-side transfer apparatus comprising:
  a disclosure data table that stores disclosure data and disclosure time in association with each other; and
  a second time keeping function and a second time synchronization function for matching the time of the second time keeping function with the master clock;
  wherein
  the distribution server referring to the time of the first time keeping function and the distribution data table to send in advance the disclosure data and the disclosure time at the distribution time to the user-side transfer apparatus;
  the user-side transfer apparatus storing the disclosure data and the disclosure time received from the distribution server, in the disclosure data table; and
  the user-side transfer apparatus referring to the disclosure data table to send the disclosure data to the user equipment when the time of the second time keeping function matches the disclosure time.

According to the third solving means of the present invention, there is provided a transfer apparatus in a transfer network system that includes a distribution server serving as a data distribution source transfer apparatus and the transfer apparatus of user-side, the transfer apparatus being connected to distribution-destination user equipment, the transfer apparatus comprising:
 a disclosure data table that stores disclosure data and disclosure time in association with each other; and
 a second time keeping function and a second time synchronization function for matching the time of the second time keeping function with a master clock;
 wherein,
 when the distribution server refers to the time of a first time keeping function, which matches the master clock, and refers to a distribution data table that stores disclosure data, disclosure time, and distribution time in association with each other, to send in advance the disclosure data and the disclosure time at the distribution time to the transfer apparatus,
 the transfer apparatus storing the disclosure data and the disclosure time received from the distribution server, in the disclosure data table; and
 the transfer apparatus referring to the disclosure data table to send the disclosure data to the user equipment when the time of the second time keeping function matches the disclosure time.

According to the present invention, the differences in data disclosure time among a plurality of users can be reduced to increase fairness when data is disclosed to the users by using a transfer network and a transfer apparatus. In addition, the users can be prevented from adversely affecting data disclosure time control. In one aspect of the present invention, the differences in data disclosure time among users are reduced in push technology service. In another aspect of the present invention, the differences in data disclosure time among users are reduced in pull technology service. In another aspect of the present invention, the concealment of data transferred in a transfer network is improved in a data disclosure time difference reduction system for users. In another aspect of the present invention, fairness is maintained if a transfer network or a transfer apparatus malfunctions in a data disclosure time difference reduction system for users. In another aspect of the present invention, fairness is increased in data receiving at user equipment in a data disclosure time difference reduction system for users. In another aspect of the present invention, fairness is maintained if user equipment malfunctions in a data disclosure time difference reduction system for users.

BRIEF DESCRIPTION OF THE DRAWINGS

FIG. 14 is a view showing details of a distribution data table 1101 shown in FIG. 2.

FIG. 15 is a view showing details of another example 1101A of the distribution data table 1101 shown in FIG. 2.

FIG. 16 is a view showing details of a disclosure data table 1201 shown in FIG. 2.

FIG. 20 is a view showing details of a distribution data table 4101 shown in FIG. 8.

FIG. 21 is a view showing details of a disclosure data table 4201 shown in FIG. 8.

DESCRIPTION OF THE PREFERRED EMBODIMENTS

Embodiments of the present invention will be described below with reference to the drawings.

1. First Embodiment

In the present embodiment, a transfer network system will be described in which a distribution server performs simultaneous data disclosure in a push technology service to a plurality of user equipment connected to the distribution server through a network terminal and a transfer network.

Figure 1:
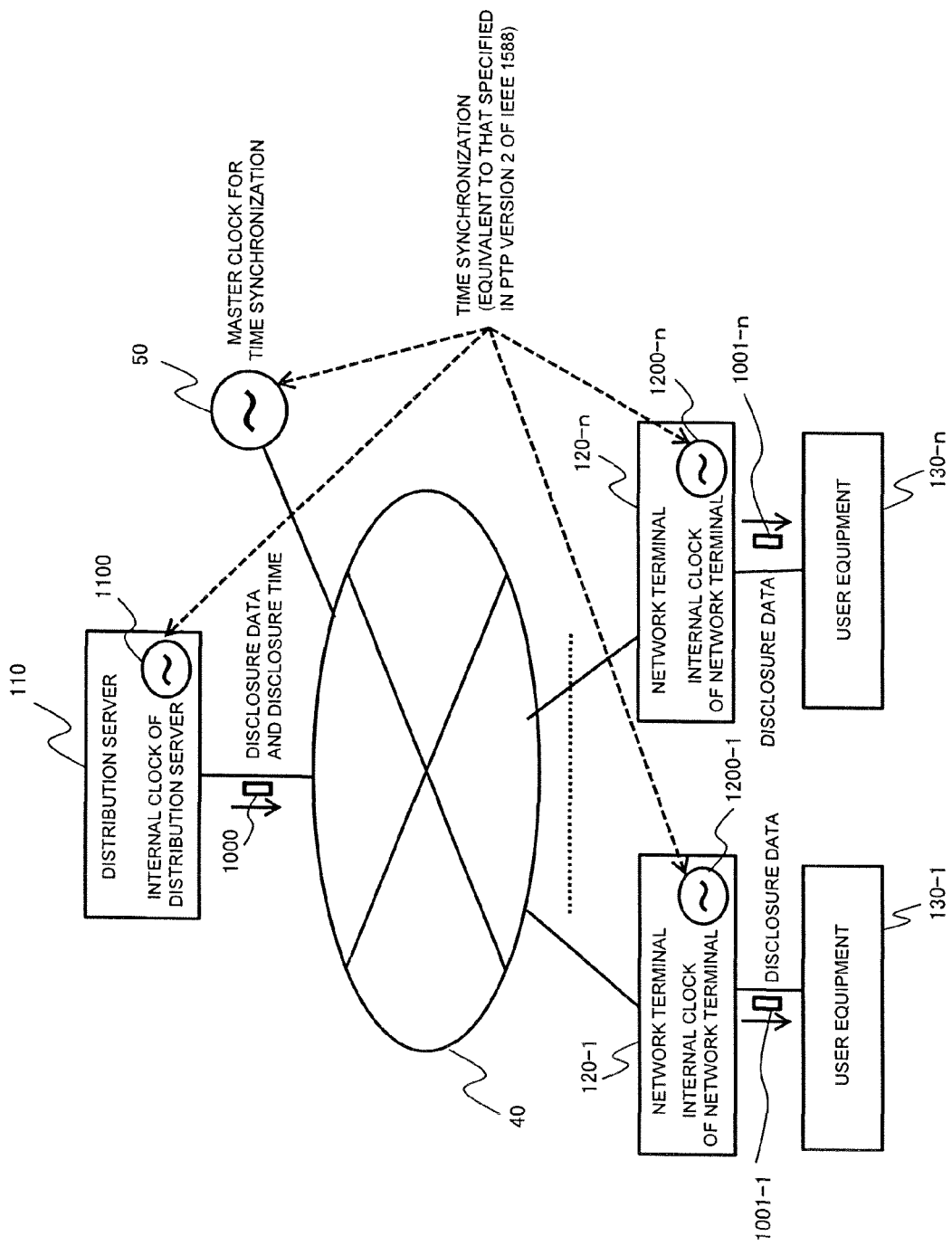
FIG. 1 is a view showing an example structure of a transfer network system according to a first embodiment of the present invention.

FIG. 1 is a view showing an example structure of the transfer network system of the present embodiment. In the figure, user equipment 130-1 to 130-n is connected to a distribution server 110 through network terminals 120-1 to 120-n, respectively, and a transfer network 40. Each of the distribution server 110 and the network terminals 120-1 to 120-n has a function to perform time synchronization with a master clock 50 for time synchronization through the transfer network 40. It is assumed that time synchronization is established between an internal clock 1100 of the distribution server 110 and internal clocks 1200-1 to 1200-n of the network terminals 120-1 to 120-n, and the master clock 50 for time synchronization with time synchronization precision equivalent, for example, to that specified in the PTP version 2 of IEEE 1588. In the figure, the transfer network 40 is used for both the transfer of disclosure data and disclosure time, and the transfer of a signal for time synchronization. Different transfer networks may be used for these two types of transfer. Disclosure time means, for example, the time when disclosure data is disclosed.

A procedure used in the present transfer network system to disclose disclosure data at a certain disclosure time to user equipment 130-1 to 130-n will be described below.

The distribution server 110 sends disclosure data and disclosure time 1000 to the network terminals 120-1 to 120-n in advance. When the network terminal 120-1 to 120-n receive the disclosure data and disclosure time 1000, the network terminals 120-1 to 120-n hold the disclosure data until the internal clocks 1200-1 to 1200-n reach the received disclosure time, and sends the disclosure data to the connected user equipment 130-1 to 130-n when the disclosure time is reached.

With the use of the present transfer network system, the disclosure time, at which the disclosure data is sent to each user equipment, can be made equal with high precision (for example, in microsecond order or nanosecond order) to increase fairness among the users.

Figure 2:
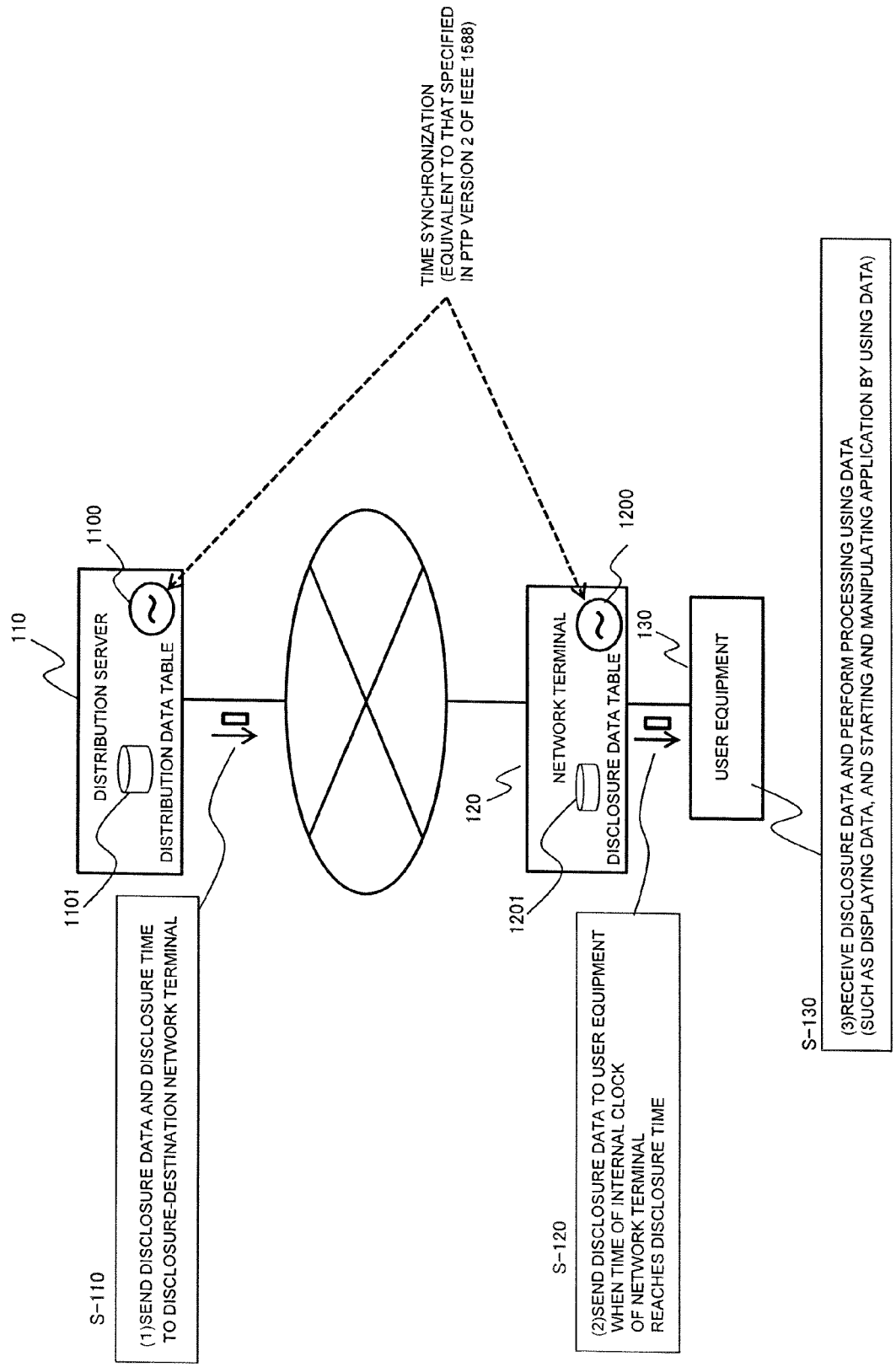
FIG. 2 is a view illustrating the operation of each apparatus shown in FIG. 1.

FIG. 2 is a view illustrating the operation of each apparatus constituting the transfer network system shown in FIG. 1. The distribution server 110 includes the internal clock 1100, a distribution data table 1101, and a transmission and receiving processor, not shown, which is connected to the transfer network 40 and which transmits and receives data. As shown in FIG. 14, the distribution data table 1101 is formed of sets of disclosure data, disclosure time, and distribution time, and is updated, for example, when an external distribution processing request is received or disclosure data and disclosure time are sent to a network terminal. In the present embodiment, it is assumed that disclosure data is formed of a disclosure data ID, a disclosure data type, and data, as an example management form of disclosure data. Disclosure data can be identified or specified by one or more of the disclosure data ID, the disclosure data type, and the data. For example, the disclosure data ID may be used to identify or specify the disclosure data; or the disclosure data type and/or the data may be used to identify or specify the disclosure data. The distribution time means the time when the distribution server sends disclosure data and disclosure time to a network terminal 120. The distribution time may be a predetermined period of time before the disclosure time, or may be specified for each disclosure data separately. When the time of the internal clock 1100 of the distribution server reaches any distribution time listed in the distribution data table, the distribution server 110 sends the corresponding disclosure data and disclosure time (S-110).

FIG. 15 is a view showing details of another example 1101A of the distribution data table 1101 shown in FIG. 2. In the above description, it is assumed that data disclosure is allowed for all connected users. The transmission destination of disclosure data and disclosure time may be set to a destination network terminal specified in advance for each disclosure data. In that case, as shown in FIG. 15, the distribution data table 1101A, made by adding destination network terminals to the distribution data table 1101, is used, and disclosure data and disclosure time are sent based on the destination network terminals.

The network terminal 120 includes the internal clock 1200, a disclosure data table 1201, and a transmission and receiving processor, not shown, which is connected to the transfer network 40 and which transmits and receives data.

FIG. 16 is a view showing details of the disclosure data table 1201 shown in FIG. 2. As shown in FIG. 16, the disclosure data table 1201 is formed of sets of disclosure data and disclosure time, and is updated, for example, when disclosure data and disclosure time are received from the distribution server 110 or when disclosure data is sent to the user equipment 130. The details of disclosure data and disclosure time are the same as those shown in FIG. 15. When the time of the internal clock 1200 of the network terminal 120 reaches any disclosure time listed in the disclosure data table 1201, the network terminal 120 sends the corresponding disclosure data to the user equipment 130 (S-120).

When the user equipment 130 receives the disclosure data from the network terminal 120, the user equipment performs processing using the disclosure data (S-130). The details of the processing performed by using the disclosure data are not especially specified in the present invention or in the present embodiment, but it is expected that the processing includes displaying the data on a user interface and starting and manipulating an application by using the data.

Figure 3:
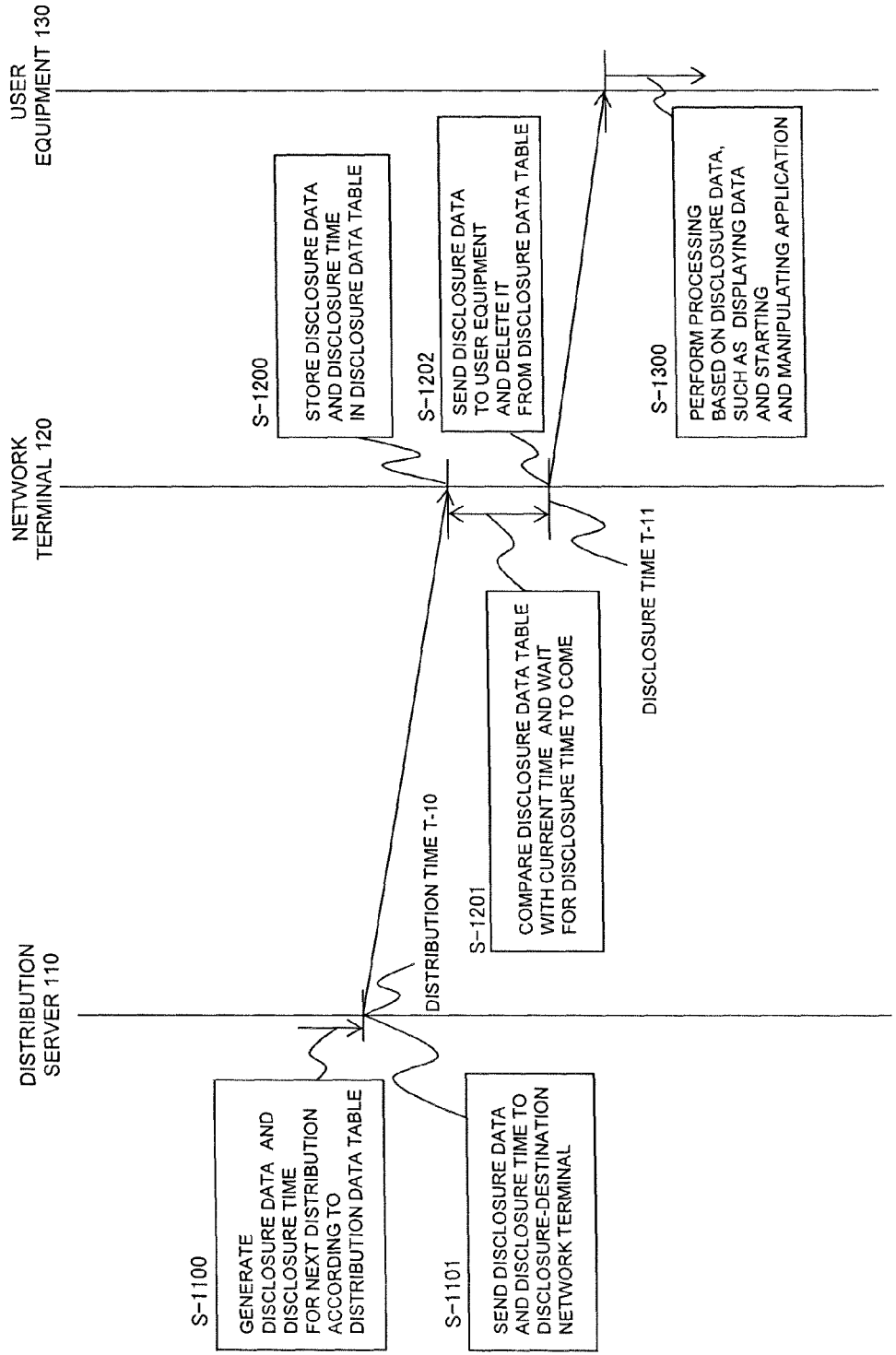
FIG. 3 is a sequence chart showing processing between the apparatuses shown in FIG. 2.

FIG. 3 is a sequence chart showing processing between the apparatuses shown in FIG. 2. A series of processing performed when the distribution server 110 discloses data to the user equipment 130 will be described with reference to the figure. The distribution server 110 generates disclosure data and disclosure time according to the distribution data table 1101 in S-1100. When the time of the internal clock 1100 of the distribution server 110 reaches distribution time T-10, the distribution server 110 sends the disclosure data and the disclosure time to the network terminal 120 in S-1101. When the network terminal 120 receives the disclosure data and the disclosure time, the network terminal 120 stores them in the disclosure data table 1201 in S-1200. The network terminal 120 compares the disclosure data table 1201 with the current time of the internal clock 1200, and waits for disclosure time T-11 to come in S-1201. When the current time reaches disclosure time T-11, the network terminal 120 sends the disclosure data to the user equipment 130 and deletes the data from the disclosure data table 1201 in S-1202. When the user equipment 130 receives the disclosure data, the user equipment 130 performs processing based on the disclosure data, such as displaying the data and starting and manipulating an application.

Figure 4:
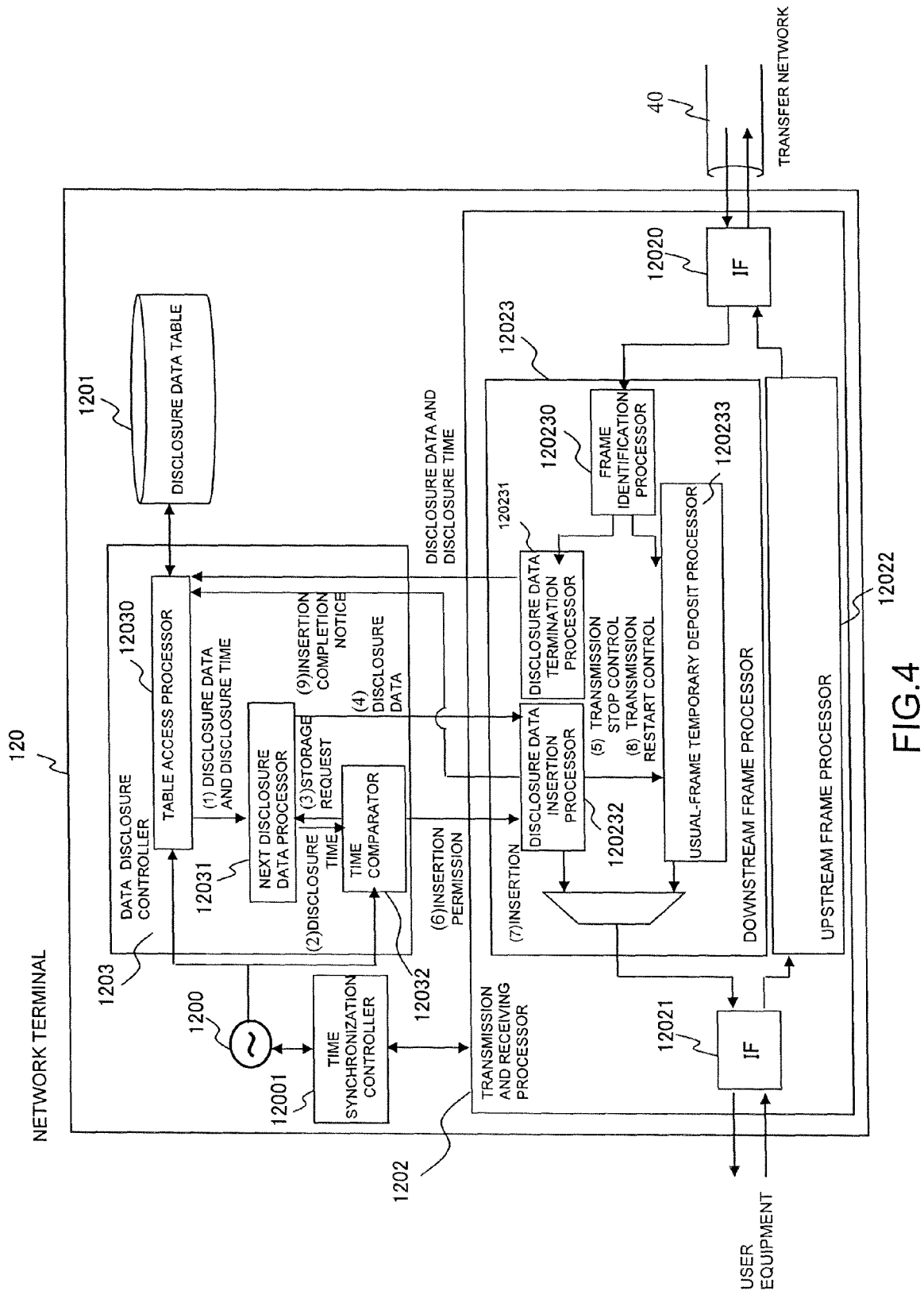
FIG. 4 is a functional block diagram of a network terminal 120.

FIG. 4 is an example functional block diagram of the network terminal 120, which implements the processing shown in FIG. 1 to FIG. 3. The network terminal 120 includes the internal clock 1200, the disclosure data table 1201, the transmission and receiving processor 1202, a data disclosure controller 1203, and a time synchronization controller 12001 for controlling the time synchronization of the internal clock 1200. The transmission and receiving processor 1202 includes an interface 12020 with the transfer network 40, an interface 12021 with the user equipment 130, an upstream frame processor 12022, and a downstream processor 12023, and performs transmission and receiving.

In the present embodiment, the downstream frame processor 12023 transfers usual downstream frames and also inserts disclosure data at the disclosure time; and works together with the data disclosure controller 1203 to implement data disclosure in which disclosure time is controlled with high precision. A specific operation therefor will be described below.

First, a procedure for implementing the operation of S-1200 shown in FIG. 3 will be described. When the downstream frame processor 12023 receives disclosure data and disclosure time from the distribution server, a frame identification processor 120230 identifies the frame as a frame that includes the disclosure data and the disclosure time and transfers the frame to a disclosure data termination processor 120231. The disclosure data termination processor 120231 transfers the disclosure data and the disclosure time included in the frame to a table access processor 12030 of the data disclosure controller 1203. When the table access processor 12030 receives the disclosure data and the disclosure time, the table access processor 12030 adds them to the disclosure data table 1201.

Next, a procedure for implementing the operation of S-1201 shown in FIG. 3 will be described. The table access processor 12030 polls the disclosure data table 1201 at intervals of a predetermined period of time, such as several seconds, and transfers the disclosure data and the disclosure time of an entry whose disclosure time is the closest to the current time indicated by the internal clock 1200 of the network terminal, to a next disclosure data processor 12031 (step (1)). The next disclosure data processor 12031 stores the disclosure data and the disclosure time and transfers the disclosure time to a time comparator 12032 (step (2)). The time comparator 12032 compares the disclosure time with the current time of the internal clock 1200, and transfers a storage request to the next disclosure data processor 12031 when the current time becomes within a predetermined period of time, for example, several seconds, from the disclosure time (step (3)). With this, the next disclosure data processor 12031 transfers the disclosure data to a disclosure data insertion processor 120232 (step (4)). Upon receiving the disclosure data, the disclosure data insertion processor 120232 holds the disclosure data and applies usual-frame transmission stop control to a usual-frame temporary deposit processor 120233 (step (5)). With these processes, the downstream frame processor 12023 stops the transmission of a usual frame when the disclosure time of the disclosure data approaches, and becomes ready to insert the disclosure data promptly when the disclosure time is reached.

Next, a procedure for implementing the operation of s-1202 shown in FIG. 3 will be described. After the process of step (3), the time comparator 12032 transfers an insertion permission to the disclosure data insertion processor 120232 when the current time reaches the disclosure time (step (6)). When the disclosure data insertion processor 120232 receives the insertion permission, the disclosure data insertion processor 120232 inserts the stored disclosure data promptly (step (7)). Upon the completion of this insertion process, the disclosure data insertion processor 120232 applies transmission restart control to the usual-frame temporary deposit processor 120233 (step (8)), and also transfers an insertion completion notice to the table access processor 12030 (step (9)). When the table access processor 12030 receives the insertion completion notice, the table access processor 12030 deletes the disclosure data which has been inserted and the disclosure time from the disclosure data table 1201.

With the operations of S-1201 and S-1202, described above, the transmission and receiving processor 1202 and the data disclosure controller 1203 of the network terminal 120 implement the highly precisely controlled transmission of the disclosure data to the user equipment 130 at the disclosure time. Since this data disclosure control is performed in the network terminal 120 and is independent of the upstream frame processing, unauthorized manipulation of disclosure data by any users can be prevented.

2. Second Embodiment

In the present embodiment, a transfer network system will be described in which a distribution server performs simultaneous data disclosure in a pull technology service to a plurality of user equipment connected to the distribution server through a network terminal and a transfer network. In the present embodiment, elements and operations different from and added to the first embodiment will be described below with reference to FIG. 5 and FIG. 6. The structure of the transfer network system of the present embodiment is the same as in the first embodiment, as shown in FIG. 1.

Figure 5:
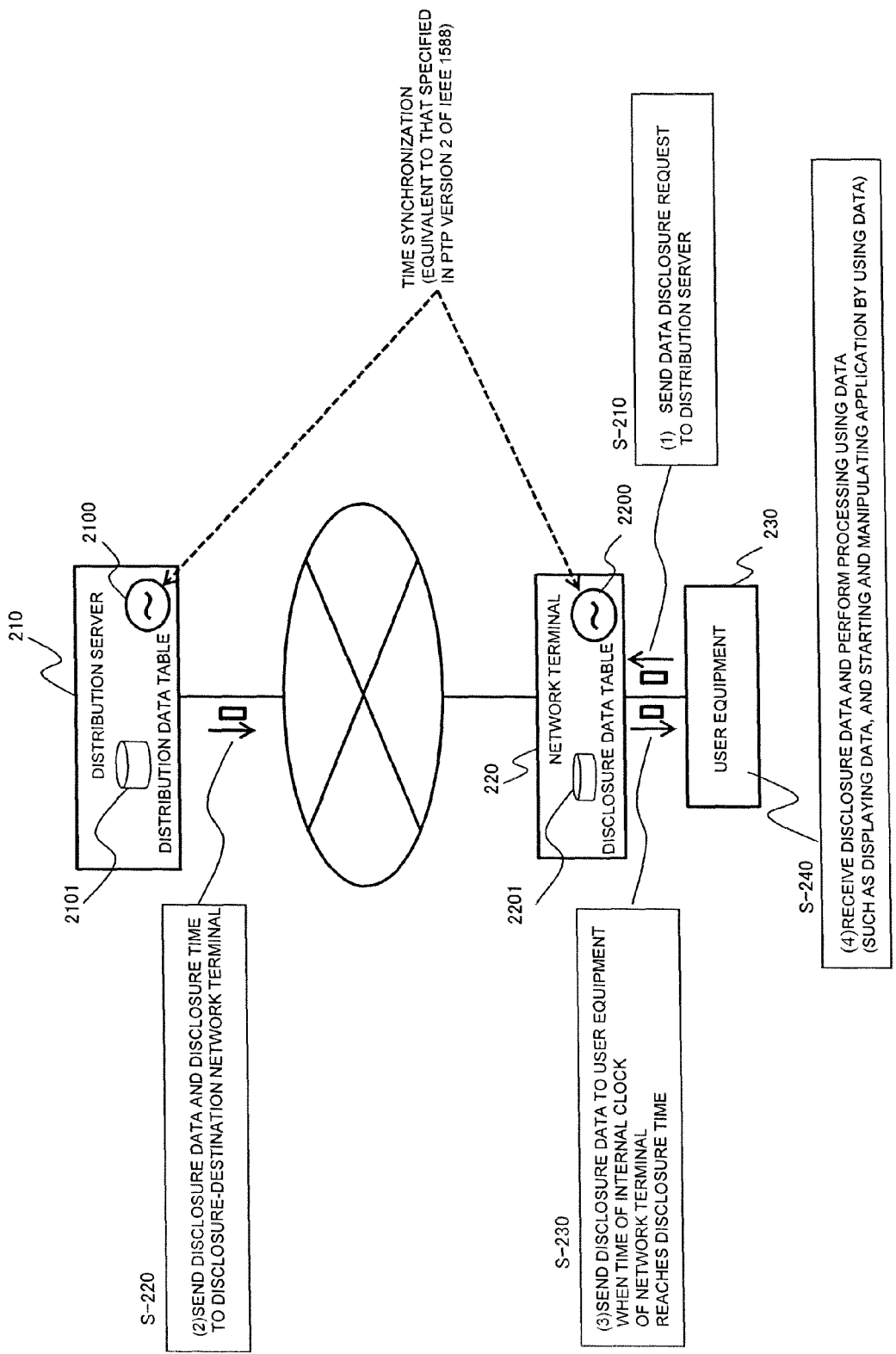
FIG. 5 is a view illustrating the operation of a transfer network system according to a second embodiment of the present invention.

FIG. 5 is a view illustrating the operation of the transfer network system of the present embodiment. In the present embodiment, the distribution server sends disclosure data and disclosure time to the network terminal connected to the user equipment that has sent a data disclosure request in advance. The processing of a distribution server 210, a network terminal 220, and user equipment 230, which implement the above-described operation, will be described below.

The user inputs into the user equipment 230 a data disclosure request for data to be disclosed at a specific time. This request is made, for example, by specifying destination network terminal information for identifying the network terminal, and the ID and type of disclosure data on an application and by sending the data disclosure request. The user equipment 230 sends this data disclosure request to the distribution server 210 through the network terminal 220 (S-210). The distribution server 210 updates destination network terminal information in a distribution data table 2101 according to a data disclosure request received a predetermined period of time, for example, several minutes, before the distribution time of disclosure data. It is assumed that the distribution data table 2101 is formed of sets of disclosure data, disclosure time, and destination network terminal information, in the same manner as the distribution data table 1101A shown in FIG. 15. Instead of the destination network terminal information, user equipment information for identifying user equipment may be used. Processes to be performed thereafter and relevant to data disclosure, S-220, S-230, and S-240 are the same as in the first embodiment and correspond to S-110, S-120, and S-130, respectively.

Figure 6:
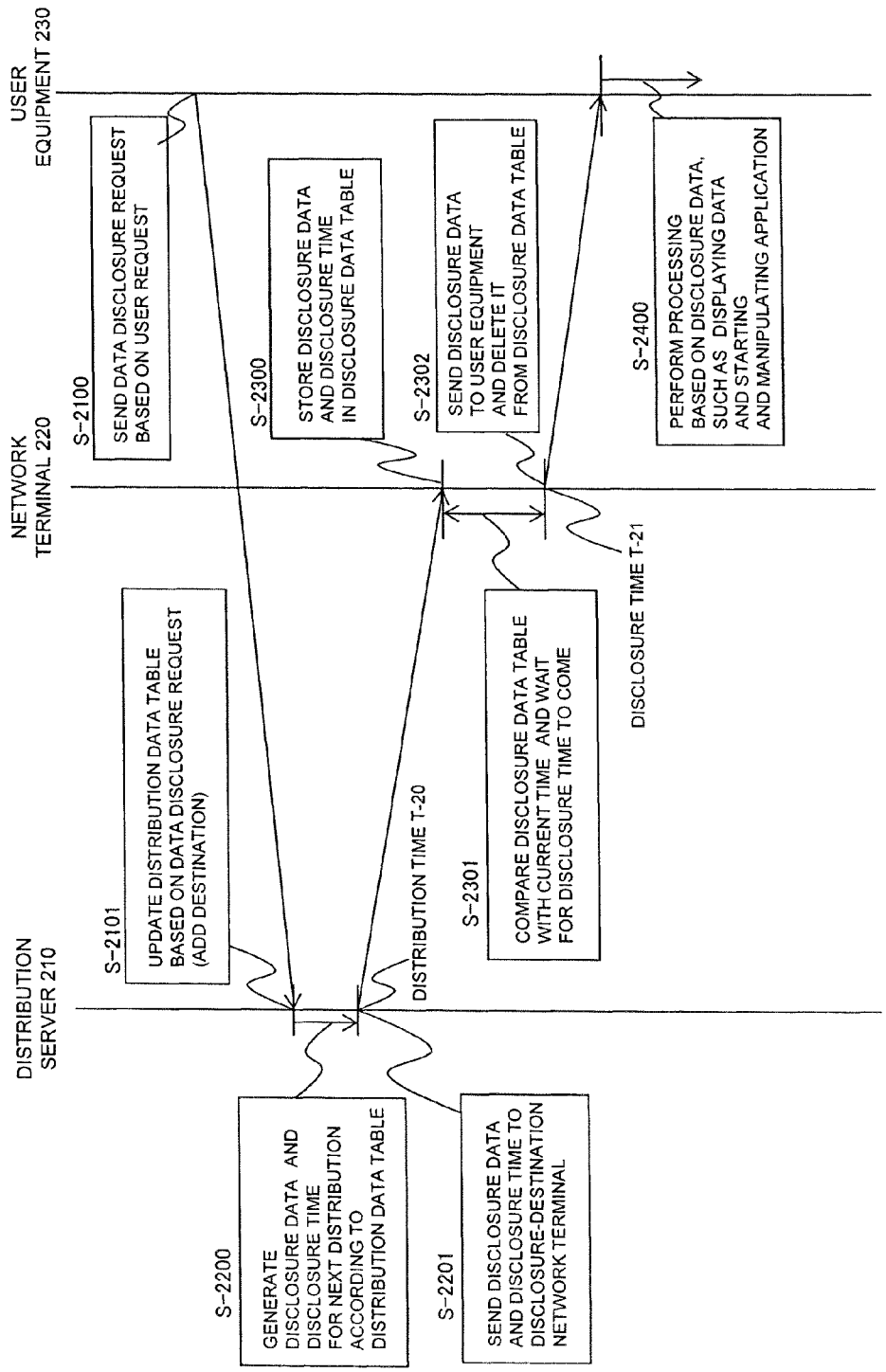
FIG. 6 is a sequence chart showing processing between the apparatuses shown in FIG. 5.

FIG. 6 is a sequence chart showing processing between the apparatuses shown in FIG. 5. The user equipment 230 sends a data disclosure request in S-2100 based on a user request. When the distribution server 210 receives the request, the distribution server 210 updates the distribution data table 2101 in S-2101. Processes to be performed thereafter and relevant to data disclosure, S-2200, S-2201, S-2300, S-2301, S-2302, and S-2400 are the same as in the first embodiment and correspond to S-1100, S-1101, S-1200, S-1201, S-1202, and S-1300, respectively. In the present embodiment, as shown in FIG. 15, for example, the distribution data table 1101A, generated by adding the destination network terminal information to the distribution data table 1101, is used to send disclosure data and disclosure time according to the destination network terminal information.

3. Third Embodiment

In the present embodiment, a transfer network system will be described in which a distribution server performs simultaneous data disclosure to a plurality of user equipment connected to the distribution server through a network terminal and a transfer network, by encrypting data to be transferred and transferring it. In the present embodiment, elements and operations different from and added to the first embodiment or the second embodiment will be described below with reference to FIG. 7. The structure of the transfer network system of the present embodiment is the same as in the first embodiment or the second embodiment, as shown in FIG. 1 or FIG. 5.

Figure 7:
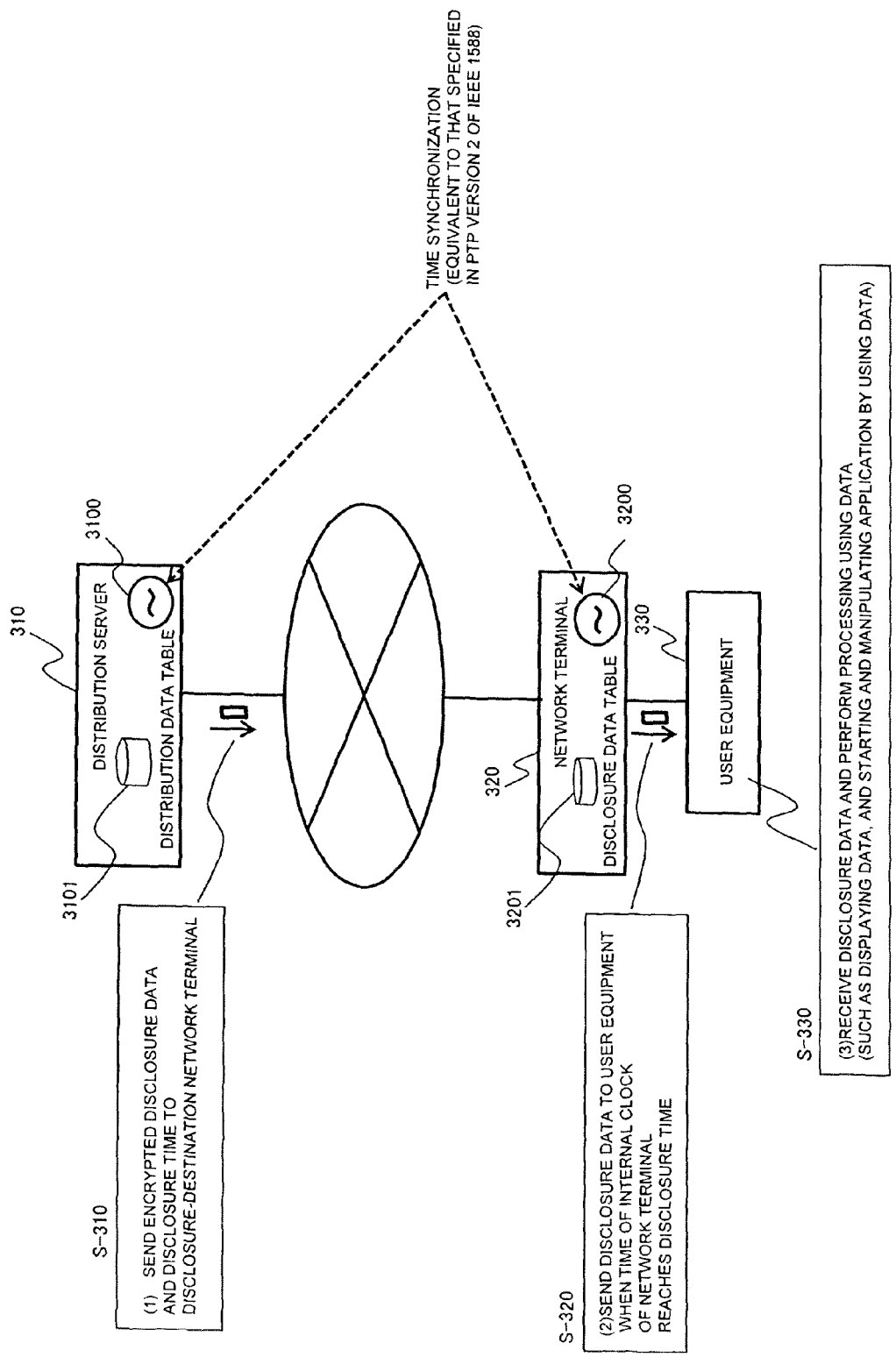
FIG. 7 is a view illustrating the operation of a transfer network system according to a third embodiment of the present invention.

FIG. 7 is a view illustrating the operation of the transfer network system of the present embodiment. In the present embodiment, when the distribution server sends disclosure data and disclosure time to the network terminal, the distribution server encrypts the disclosure data and the disclosure time to increase the concealment level of the disclosure data. It is assumed that when the network terminal receives the encrypted disclosure data, the network terminal decrypts it, and the decryption key is distributed in advance from the distribution server. To implement the operation, a distribution server 310 is made by adding an encryption processor to the transmission and receiving processor of the distribution server 110 or 210 of the first embodiment or the second embodiment, and a network terminal 320 is made by adding a decryption processor to the transmission and receiving processor of the network terminal 120 or 220 of the first embodiment or the second embodiment.

Only one of the disclosure data and the disclosure time may be encrypted.

4. Fourth Embodiment

In the present embodiment, a transfer network system will be described in which a distribution server performs simultaneous data disclosure to a plurality of user equipment connected to the distribution server through a network terminal and a transfer network, after the distribution server checks a disclosure data normal reception response sent from each network terminal. In the present embodiment, elements and operations different from and added to the first embodiment or the second embodiment will be described below with reference to FIG. 8 and FIG. 9. The structure of the transfer network system of the present embodiment is the same as in the first embodiment or the second embodiment, as shown in FIG. 1 or FIG. 5.

Figure 8:
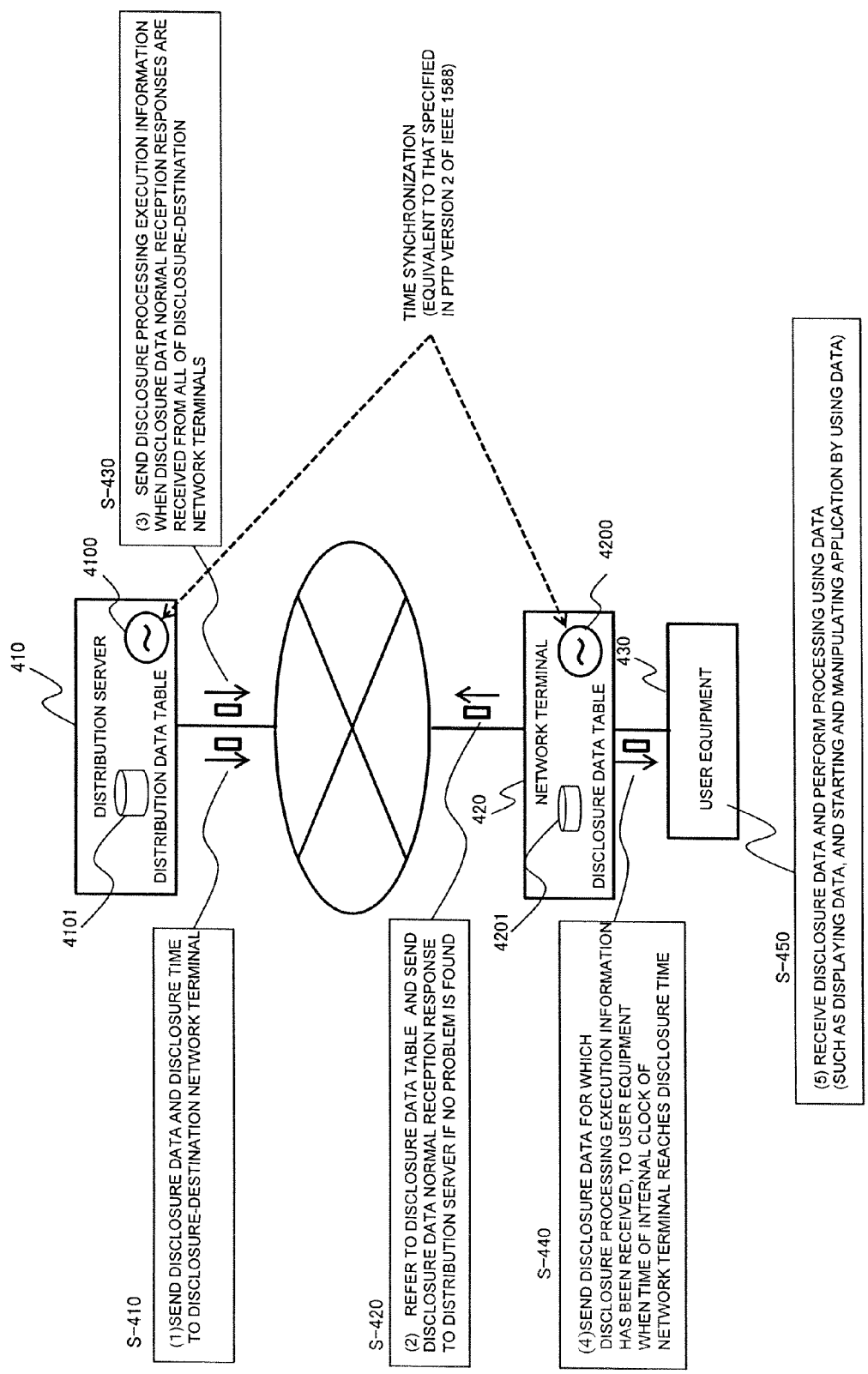
FIG. 8 is a view illustrating the operation of a transfer network system according to a fourth embodiment of the present invention.
Figure 17:
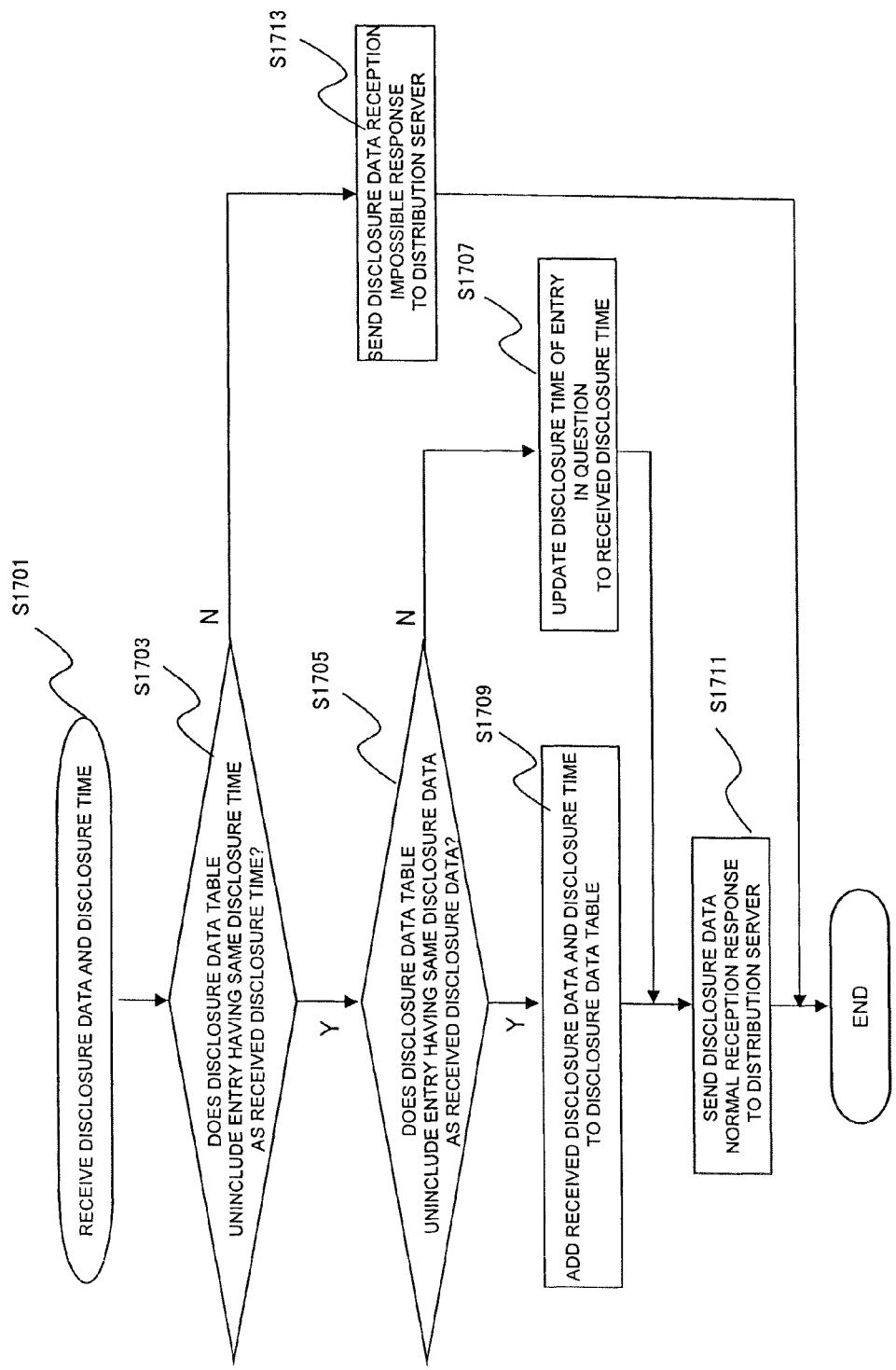
FIG. 17 is a flowchart showing the operation of a network terminal 420 shown in FIG. 8, performed when the network terminal 420 receives disclosure data and disclosure time.

FIG. 8 is a view illustrating the operation of the transfer network system of the present embodiment. FIG. 17 is a flowchart showing the operation performed when a network terminal 420 shown in FIG. 8 receives disclosure data and disclosure time. As shown in the flowchart of FIG. 17, in the present embodiment, when the network terminal 420 receives disclosure data and disclosure time from a distribution server 410 (S1701), the network terminal 420 refers to a disclosure data table 4201 to determine whether the disclosure data table 4201 unincludes an entry having the same disclosure time as the received disclosure time (S1703). When normal reception is possible (for example, when there is no entry having another disclosure data at the same disclosure time), the network terminal 420 performs addition to or updating of the disclosure data table 4201 based on the received disclosure data and disclosure time (S1705 to S1709). For example, when the disclosure data table 4201 includes an entry having the same disclosure data as the received disclosure data (S1705), the network terminal 420 updates the disclosure time of that entry to the received disclosure time (S1707). In contrast, when the disclosure data table 4201 unincludes an entry having the same disclosure data as the received disclosure data (S1705), the network terminal 420 adds the received disclosure data and disclosure time to the disclosure data table 4201 (S1709). Then, the network terminal 420 sends a disclosure data normal reception response to the distribution server 410 (S1711) (S-420). If normal reception is impossible, for example, if the disclosure data table 4201 includes an entry having the same disclosure time as the received disclosure time (S1703), the network terminal 420 sends a disclosure data reception impossible response to the distribution server 410 (S-1713).

Figure 18:
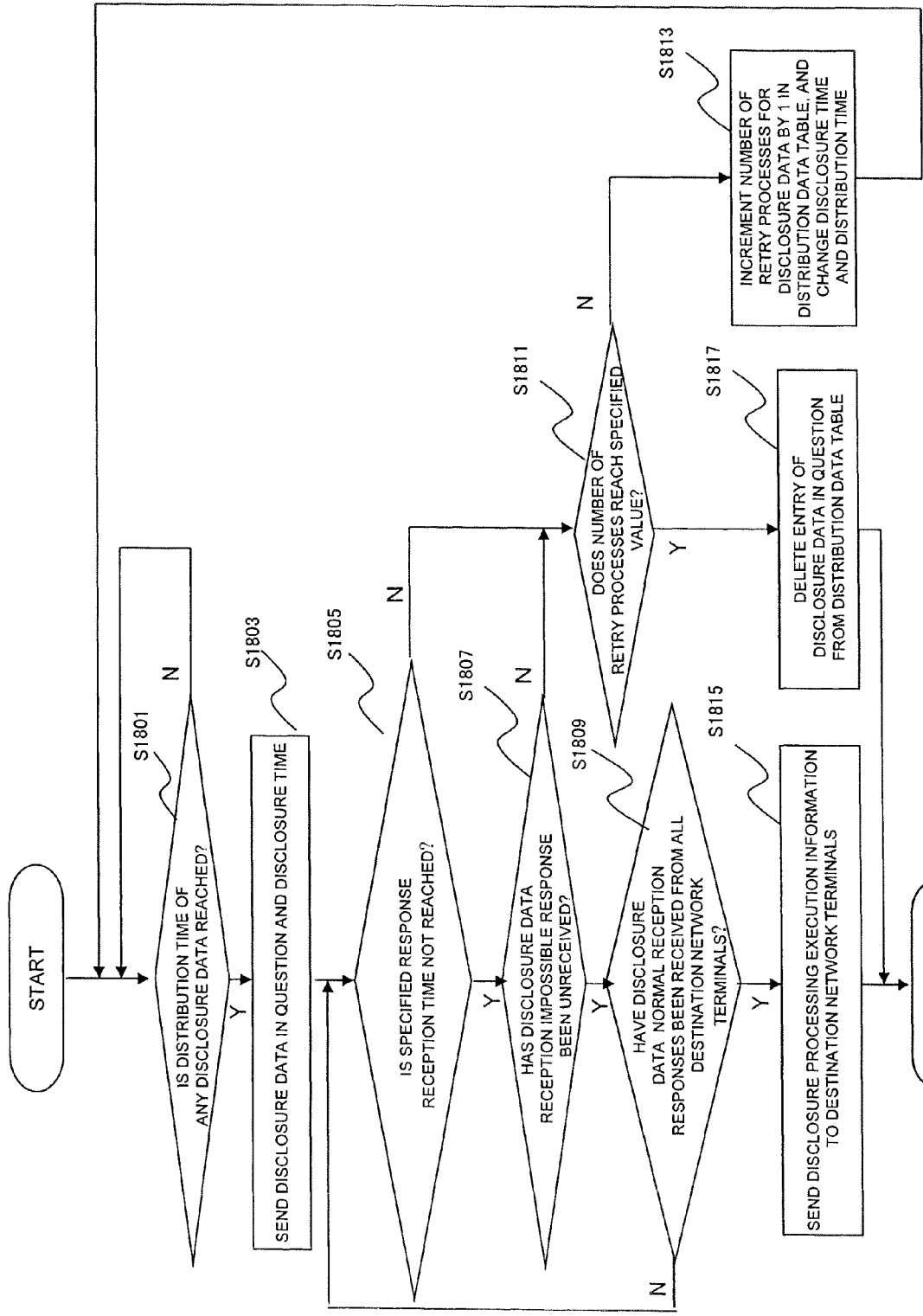
FIG. 18 is a flowchart showing the operation of a distribution server 410 shown in FIG. 8.

FIG. 18 is a flowchart showing the operation of the distribution server 410 shown in FIG. 8. As shown in the flowchart of FIG. 18, when the distribution time is reached (S1801), the distribution server 410 sends disclosure data and disclosure time (S1803), and then sends disclosure processing execution information to disclosure-destination network terminals (S1815) (S-430) when the distribution server 410 receives disclosure data normal reception responses from all of the disclosure-destination network terminals (S1805 to S1809). Through the determinations in steps S1805, S1807, and S1809, if disclosure data normal reception responses are not received from all of the disclosure-destination network terminals until a specified response reception time during which responses are received from the destination network terminals (for example, the time several minutes before the disclosure time) (No in S1805) or if a disclosure data reception impossible response is received from any of the destination network terminals (No in S1807), the distribution server 410 changes (postpones) the disclosure time in a distribution data table 4101 (S1813) and sends the disclosure data and the disclosure time again (retry process) (S1801 and S1803) until a predetermined number of allowed retry processes is reached (S1811). For example, the disclosure time is postponed by a predetermined period of time, according to the number of retry processes. If the predetermined number of allowed retry processes is reached in step S1811, the distribution server 410 deletes the entry having the disclosure data in question from the distribution data table 4101 (S1817).

FIG. 20 is a view showing details of the distribution data table 4101 shown in FIG. 8. In the present embodiment, the distribution data table 4101 includes disclosure time, distribution time, disclosure data, and destination network terminals, and additionally includes a reception response, the number of allowed retry processes, and the number of retry processes, as shown in FIG. 20.

Figure 19:
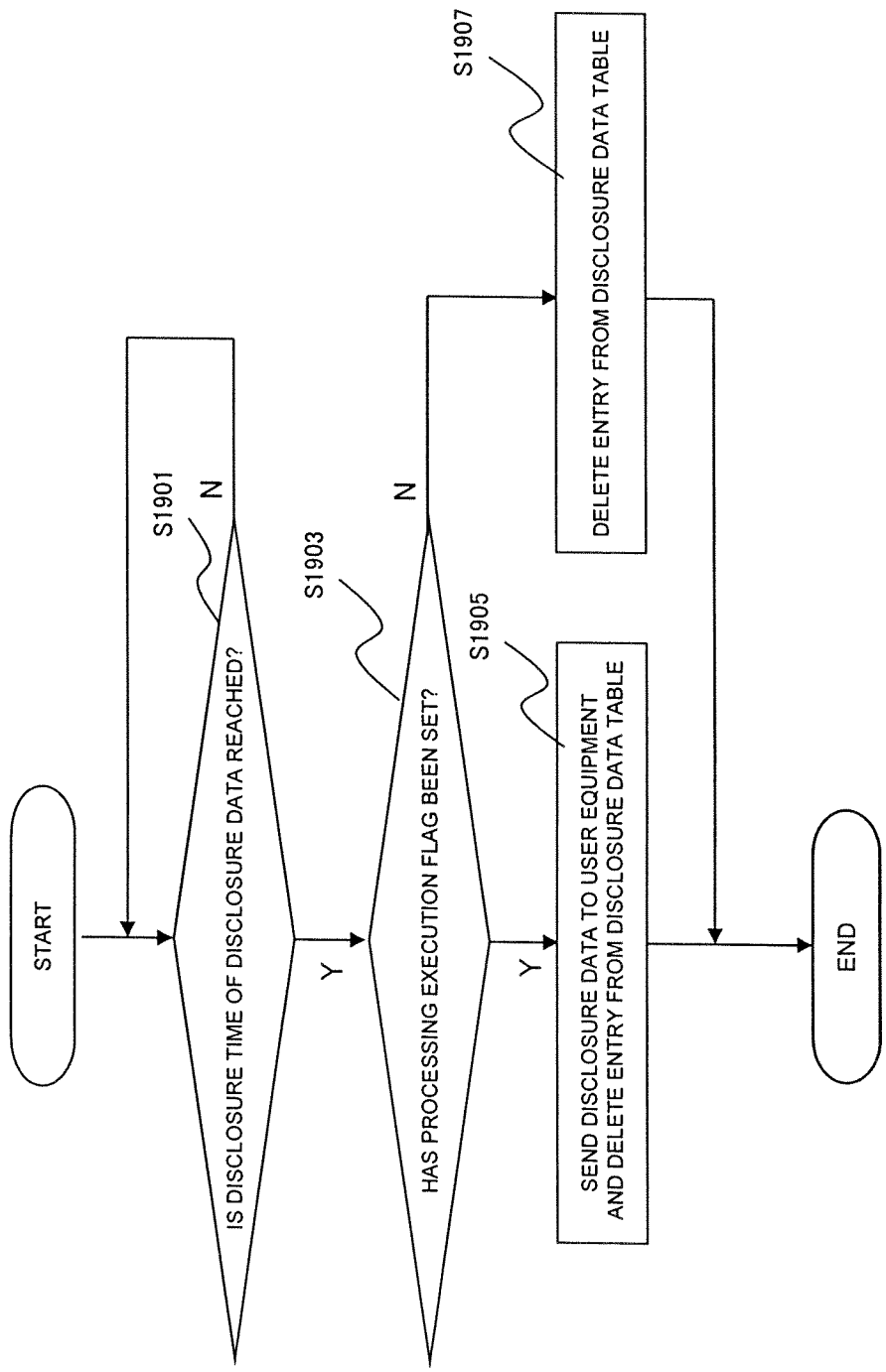
FIG. 19 is a flowchart showing the operation of the network terminal 420 shown in FIG. 8, performed when disclosure time is reached.

FIG. 19 is a flowchart showing the operation of the network terminal 420 shown in FIG. 8, performed when the disclosure time is reached. When the network terminal 420 receives disclosure processing execution information, the network terminal 420 sets a processing execution flag ("set", for example) in the entry in question in the disclosure data table. As shown in the flowchart of FIG. 19, when the disclosure time is reached (S1901), if the processing execution flag has been set ("set", for example) in an entry in the disclosure data table at the disclosure time (S1903), the network terminal 420 sends the corresponding disclosure data and disclosure time to the user equipment and deletes the entry (S1905). In contrast, if the processing execution flag has not been set ("unset", for example) (S1903), the network terminal 420 deletes the entry (S1907).

FIG. 21 is a view showing details of the disclosure data table 4201 shown in FIG. 8. In the present embodiment, the disclosure data table 4201 includes disclosure time and disclosure data, and additionally includes a processing execution flag, as shown in FIG. 21.

The other processes relevant to data disclosure control, S-410, S-440, and S-450 are the same as in the first embodiment and correspond to S-110, S-120, and S-130, respectively.

With the operation in the present embodiment, if any transfer path or any network terminal malfunctions, it is made impossible that only user equipment that is not affected by the malfunction receives data disclosure, maintaining fairness. If an identical disclosure time is specified for a plurality of disclosure data items, the disclosure time is changed to allow data disclosure to be made without any problems. When a single distribution server is used, it is possible to avoid in advance by a process in the distribution server an event in which an identical disclosure time is specified for a plurality of disclosure data items. When a plurality of distribution servers are used in a transfer network system, however, it is effective to perform the operation described in the present embodiment to avoid such an event.

Figure 9:
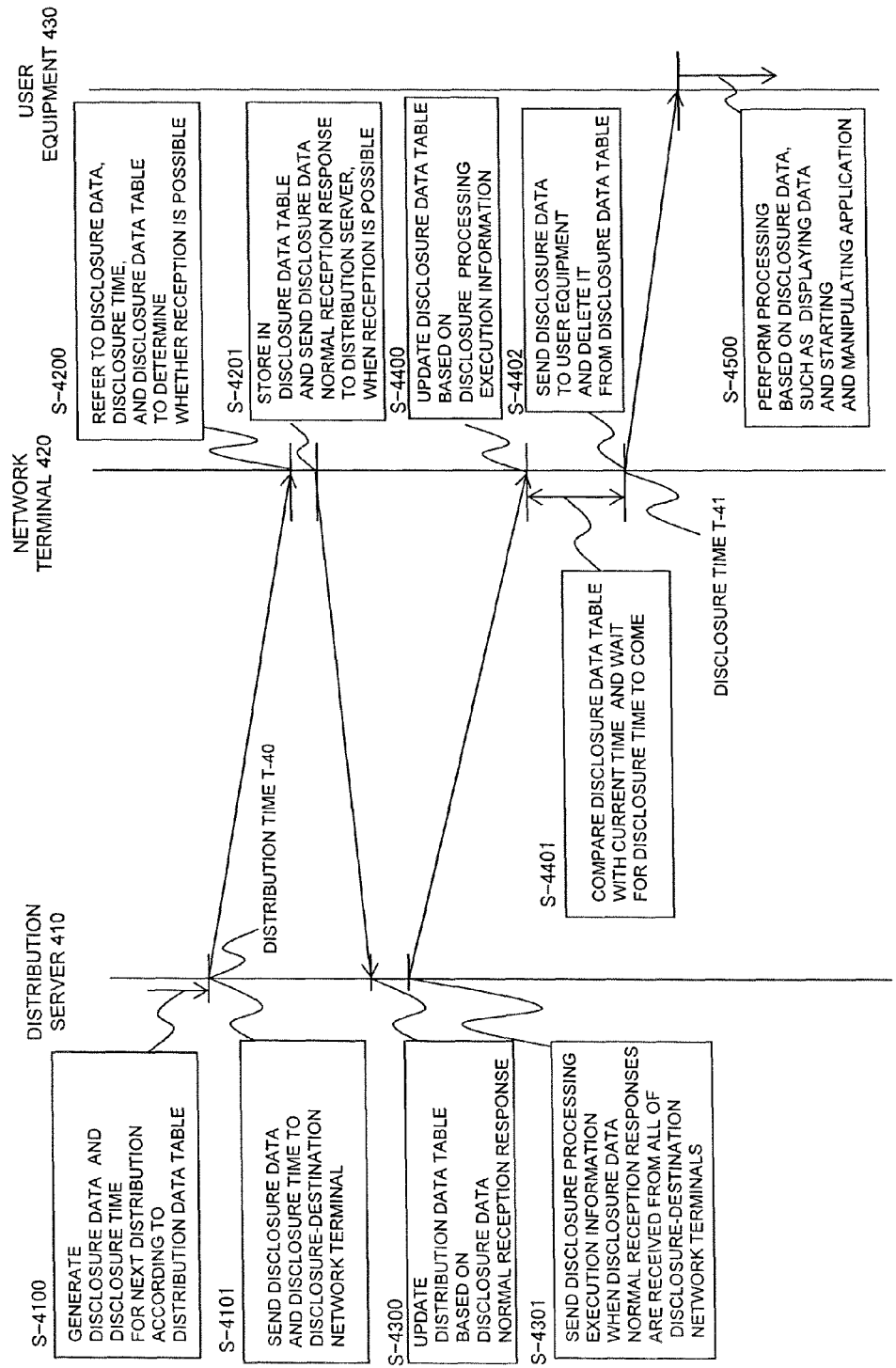
FIG. 9 is a sequence chart showing processing between the apparatuses shown in FIG. 8.

FIG. 9 is a sequence chart showing processing between the apparatuses shown in FIG. 8. When the network terminal 420 receives disclosure data and disclosure time from the distribution server 410, the network terminal 420 refers to the disclosure data table 4201 to determine whether normal reception is possible in S-4200. When it is determined that normal reception is possible, the network terminal 420 sends a disclosure data normal reception response to the distribution server 410 in S-4201. The distribution server 410 updates the distribution data table 4101 based on the disclosure data normal reception response in S-4300. When disclosure data normal reception responses have been received from all of disclosure-destination network terminals, the distribution server 410 sends disclosure processing execution information to the destination network terminals in S-4301. When the network terminal 420 receives the disclosure processing execution information, the network terminal 420 sets the processing execution flag for the disclosure data in question in the disclosure data table 4201 in S-4400. Data disclosure control is performed based on the disclosure data table 4201 in S-4401 and S-4402, which are the same as S-1201 and S-1202 shown in FIG. 3 except that disclosure is performed in S-4401 when the processing execution flag is set for each disclosure data. The other processes relevant to data disclosure, S-4100 and S-4500 are the same as in the first embodiment and correspond to S-1100 and S-1300, respectively.

5. Fifth Embodiment

In the present embodiment, a transfer network system will be described in which, when a distribution server performs simultaneous data disclosure to a plurality of user equipment connected to the distribution server through a network terminal and a transfer network, a data disclosure prior notice is sent to user equipment before data disclosure time to allow the user equipment to perform prompt disclosure data receiving processing. In the present embodiment, elements and operations different from and added to the first embodiment or the second embodiment will be described below with reference to FIG. 10 and FIG. 11. The structure of the transfer network system of the present embodiment is the same as in the first embodiment or the second embodiment, as shown in FIG. 1 or FIG. 5.

Figure 10:
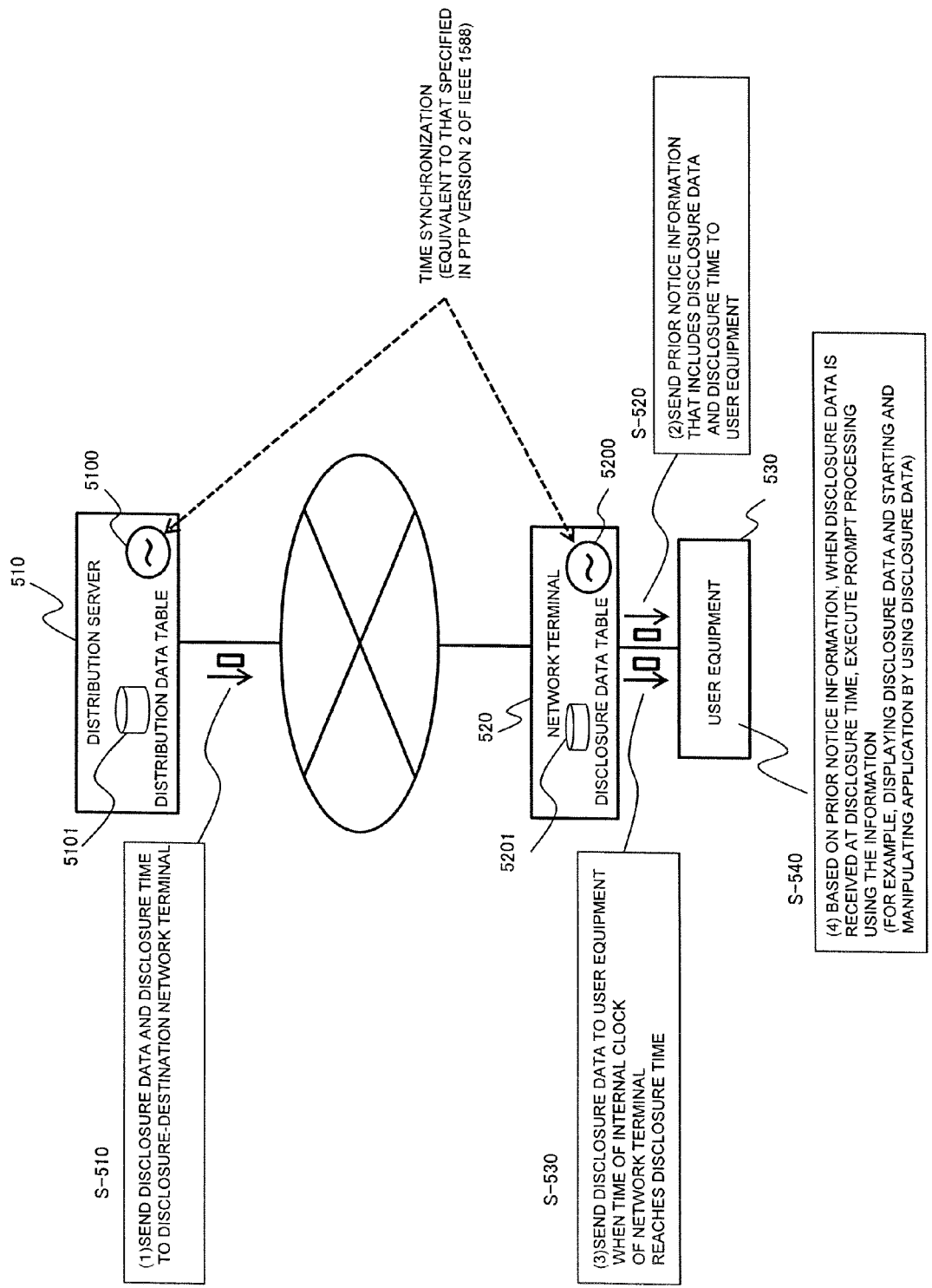
FIG. 10 is a view illustrating the operation of a transfer network system according to a fifth embodiment of the present invention.

FIG. 10 is a view illustrating the operation of the transfer network system of the present embodiment. In the present embodiment, when a network terminal 520 receives disclosure data and disclosure time from a distribution server 510, the network terminal 520 sends prior notice information that includes the disclosure time, for example, the distribution source and disclosure data type, to user equipment 530 a predetermined period of time (for example, several minutes) before the disclosure time (S-520). When the user equipment 530 receives the prior notice information, the user equipment 530 makes a preparation for receiving the disclosure data, such as starting and manipulating a browser for displaying the disclosure data and starting an application to be used, to perform prompt disclosure data processing when the disclosure data is received (S-540). With this operation, fairness is increased when each user equipment receives data disclosure.

Figure 11:
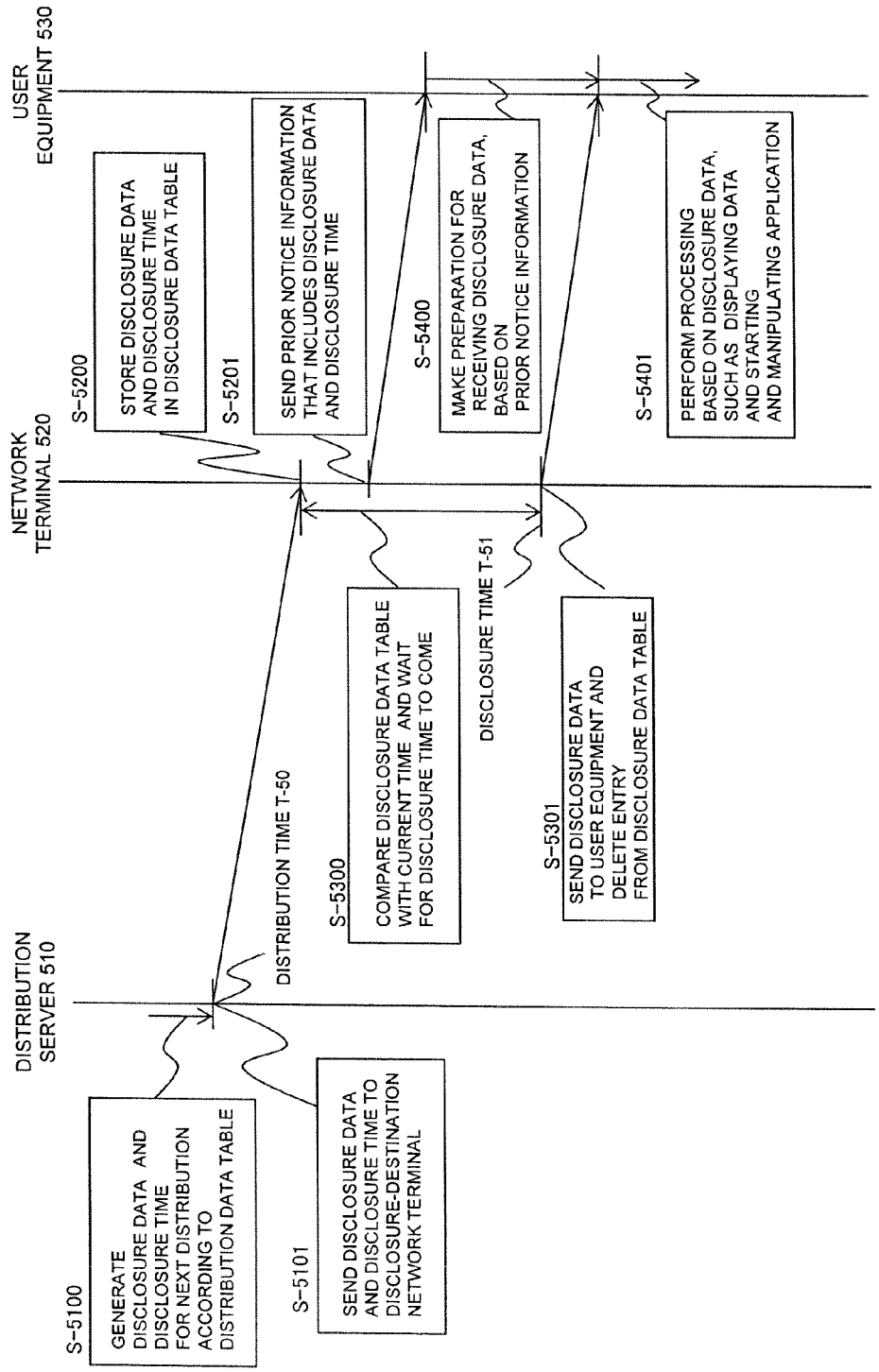
FIG. 11 is a sequence chart showing processing between the apparatuses shown in FIG. 10.

FIG. 11 is a sequence chart showing processing between the apparatuses shown in FIG. 10. When the network terminal 520 receives disclosure data and disclosure time, the network terminal 520 sends prior notice information to the user equipment 530 in S-5201. When the user equipment 530 receives the prior notice information, the user equipment 530 makes a preparation for receiving the disclosure data in S-5400. When the user equipment 530 receives the disclosure data, the user equipment 530 performs prompt data processing in S-5401. The other processes relevant to data disclosure, S-5100, S-5101, S-5200, S-5300, and S-5301 are the same as in the first embodiment and correspond to S-1100, S-1101, S-1200, S-1201, and S-1202, respectively.

6. Sixth Embodiment

In the present embodiment, a transfer network system will be described in which, when a distribution server performs simultaneous data disclosure to a plurality of user equipment connected to the distribution server through a network terminal and a transfer network, a data disclosure prior notice is sent to each user equipment and a response thereto is checked, before data disclosure. In the present embodiment, elements and operations different from and added to the first embodiment will be described below with reference to FIG. 12 and FIG. 13. The structure of the transfer network system of the present embodiment is the same as in the first embodiment, as shown in FIG. 1.

Figure 12:
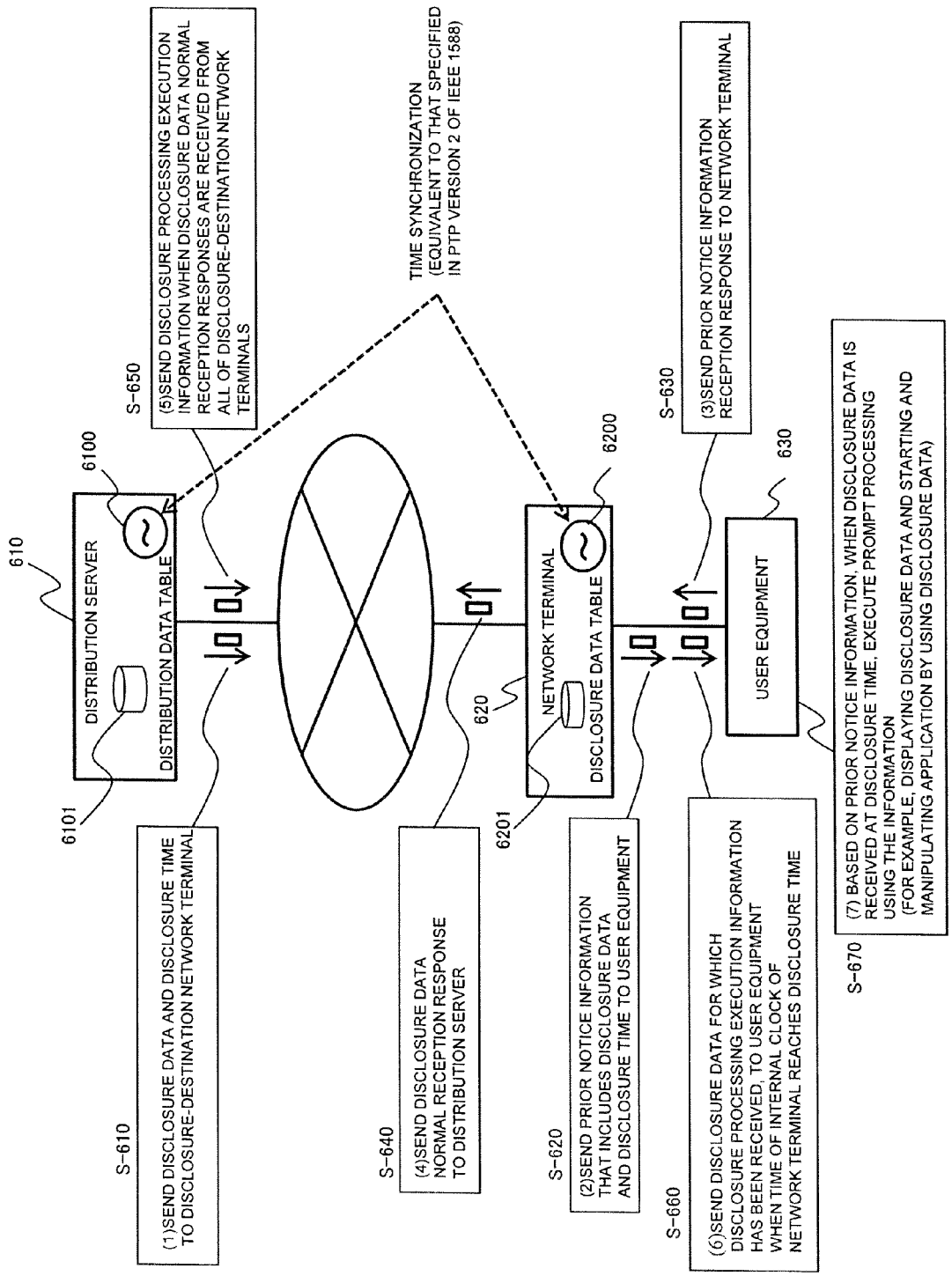
FIG. 12 is a view illustrating the operation of a transfer network system according to a sixth embodiment of the present invention.
Figure 22:
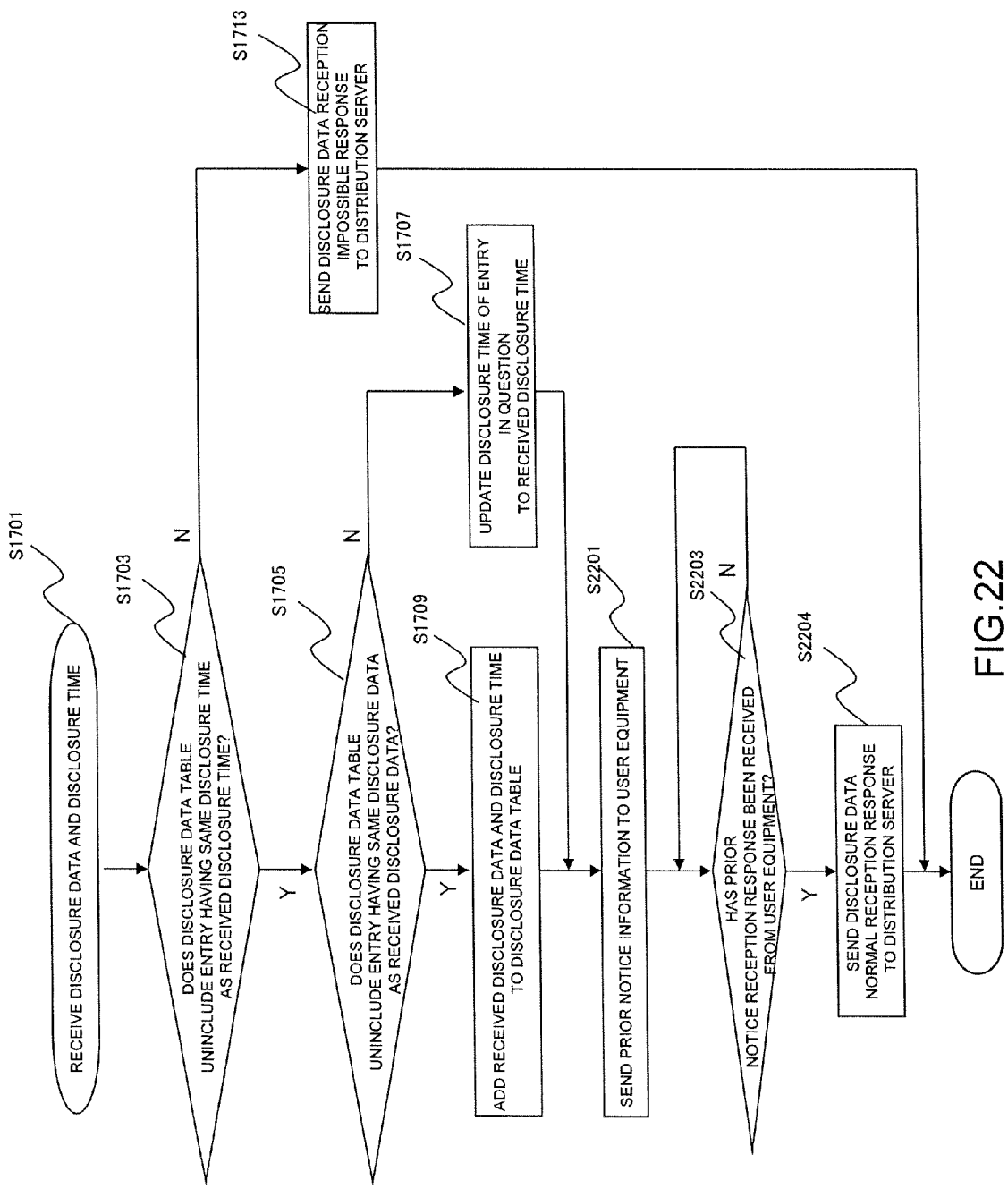
FIG. 22 is a flowchart showing the operation of a network terminal 620 shown in FIG. 13.

FIG. 12 is a view illustrating the operation of the transfer network system of the present embodiment. FIG. 22 is a flowchart showing the operation of a network terminal 620 shown in FIG. 13. In the present embodiment, as shown in the flowchart of FIG. 22, in the same way as in FIG. 17, when a network terminal 620 receives disclosure data and disclosure time from a distribution server 610 (S1701), the network terminal 620 refers to a disclosure data table 4201; when normal reception is possible, for example, when there is no entry having another disclosure data at the same disclosure time, the network terminal 620 performs addition to or updating of the disclosure data table 4201 based on the received disclosure data and disclosure time (S1703 to S1709). After step S1707 or S1709, the network terminal 620 sends prior notice information that includes the disclosure time, for example, the distribution source and disclosure data type, to user equipment 630 a predetermined period of time (for example, several minutes) before the disclosure time (S2201) (S-620). When the user equipment 630 receives the prior notice information, the user equipment 630 makes a preparation for receiving the disclosure data, and also sends a prior notice information reception response to the network terminal 620 (S-630). When the network terminal 620 receives the prior notice information reception response (S2203), the network terminal 620 sends a disclosure data normal reception response to the distribution server 610 (S2204). Processes to be performed thereafter and relevant to data disclosure are performed in the same way as in the fourth embodiment.

With this operation, if any transfer path between the distribution server and user equipment, any network terminal, or any user equipment malfunctions and normal data disclosure is not possible, it is possible not to perform data disclosure or to change the disclosure time, increasing fairness among the users.

Figure 13:
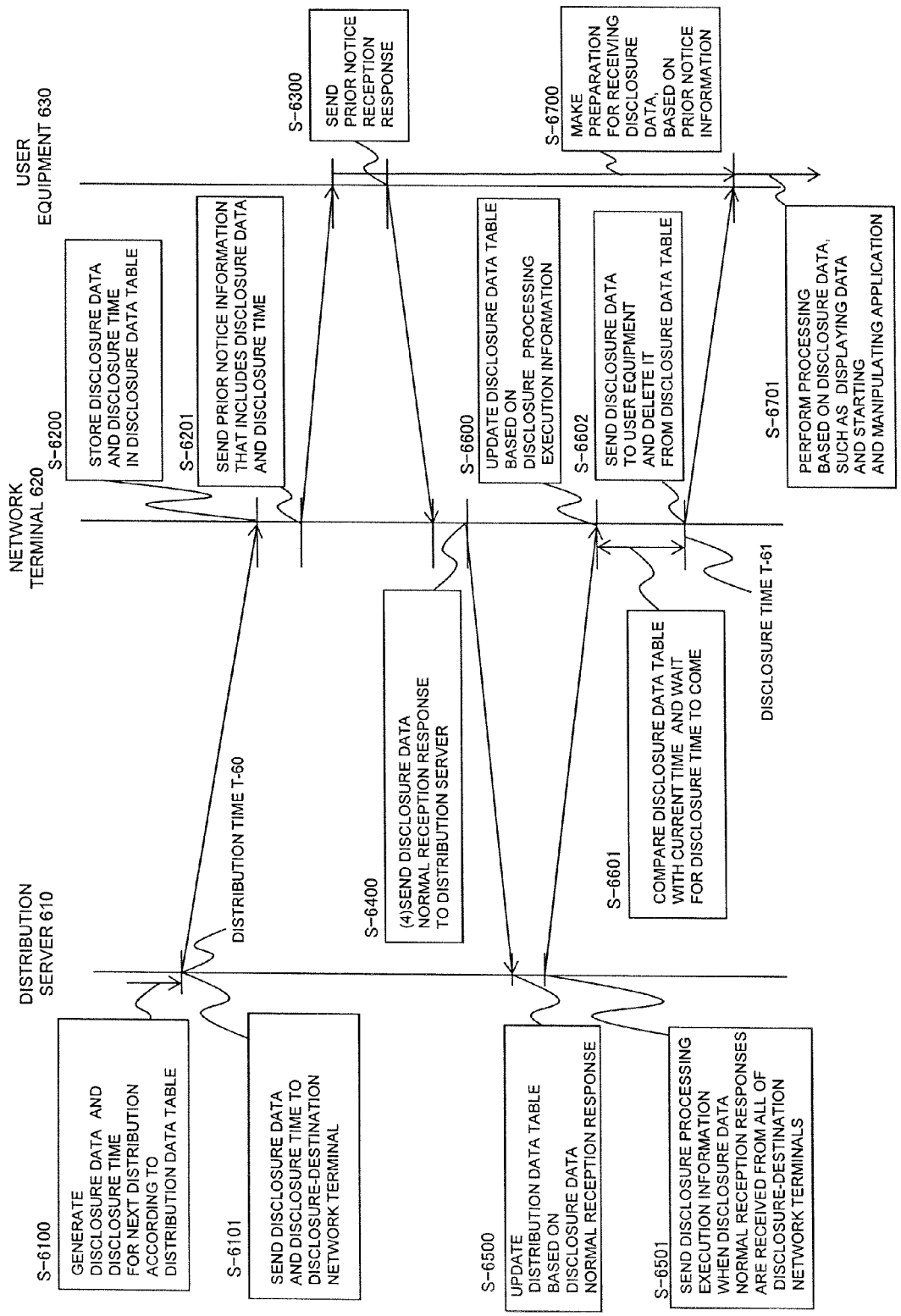
FIG. 13 is a sequence chart showing processing between the apparatuses shown in FIG. 12.

FIG. 13 is a sequence chart showing processing between the apparatuses shown in FIG. 12. When the user equipment 630 receives prior notice information from the network terminal 620, the user equipment 630 sends a prior notice reception response to the network terminal 620 in S-6300. When the network terminal 620 receives the prior notice reception response, the network terminal 620 sends a disclosure data normal reception response to the distribution server 610. The distribution server 610 performs data disclosure when disclosure data normal reception responses are received from all of destination network terminals. Data disclosure based on the disclosure data normal reception responses is implemented with the same operation as in the fourth embodiment. When the user equipment 630 receives a prior notice, prompt processing is implemented when the disclosure data is received, with the same operation as in the fifth embodiment. More specifically, S-6100, S-6101, S-6200, S-6400, S-6500, S-6501, S-6600, S-6601, and S-6602 correspond to S-4100, S-4101, S-4200, S-4201, S-4300, S-4301, S-4400, S-4401, and S-4202, respectively. S-6201, S-6700, and S-6701 correspond to S-5201, S-5400, and S-5401, respectively.

What is claimed is:

1. A transfer network system comprising:
a distribution server serving as a data distribution source transfer apparatus; and
a user-side transfer apparatus connected to distribution-destination user equipment;
the distribution server comprising:
a distribution data table that stores disclosure data, disclosure time, and distribution time in association with each other; and
a first time keeping function and a first time synchronization function for matching the time of the first time keeping function with a master clock;
the user-side transfer apparatus comprising:
a disclosure data table that stores disclosure data and disclosure time in association with each other; and
a second time keeping function and a second time synchronization function for matching the time of the second time keeping function with the master clock;
wherein
the distribution server referring to the time of the first time keeping function and the distribution data table to send in advance the disclosure data and the disclosure time at the distribution time to the user-side transfer apparatus;
the user-side transfer apparatus storing the disclosure data and the disclosure time received from the distribution server, in the disclosure data table; and
the user-side transfer apparatus referring to the disclosure data table to send the disclosure data to the user equipment when the time of the second time keeping function matches the disclosure time.

2. A transfer network system according to claim 1,
wherein information sent from the user-side transfer apparatus to the user equipment is divided into disclosure data for which disclosure processing is to be performed based on the disclosure time and general information that is sent to the user equipment from a transfer network to the user equipment without specifying time and that can be sent to the user equipment at any time; and
the user-side transfer apparatus stops sending the general information before the disclosure time of the disclosure data, and restarts sending the general information after the disclosure data is sent at the disclosure time.

3. A transfer network system according to claim 1,
wherein the distribution data table further stores destination user-side transfer apparatus information for each entry; and
the distribution server
receives from the user equipment a prior request that includes information identifying disclosure data, and user-side transfer apparatus information or user-equipment information;
stores the user-side transfer apparatus information or the user-equipment information in the destination user-side apparatus information of a corresponding entry in the distribution data table, according to the prior request; and
refers to the distribution data table to determine the user-side transfer apparatus or the user equipment serving as the transmission destination of the disclosure data and the disclosure time, and sends the disclosure data and the disclosure time at the distribution time.

4. A transfer network system according to claim 1,
wherein the distribution server sends the disclosure data and the disclosure time to the user-side transfer apparatus after encrypting the disclosure data and/or the disclosure time; and
the user-side transfer apparatus decrypts the disclosure data and/or the disclosure time when receiving.

5. A transfer network system according to claim 1,
wherein the distribution data table further stores destination user-side transfer apparatus information and reception response information for each entry;
the disclosure data table further stores disclosure processing possible/impossible information for each entry;
when the user-side transfer apparatus receives the disclosure data and the disclosure time from the distribution server, the user-side transfer apparatus determines whether disclosure processing is possible for the disclosure data and the disclosure time, stores disclosure processing possible/impossible information for a corresponding entry in the disclosure data table, and sends a response that includes the disclosure processing possible/impossible information to the distribution server;
the distribution server stores reception response information for a corresponding entry in the distribution data table, based on the response that includes the disclosure processing possible/impossible information, received from the user-side transfer apparatus,
refers to the distribution data table to determine whether disclosure processing is to be executed, postponed, or cancelled according to one or more destination user-side transfer apparatus information and reception response information, corresponding to each disclosure data and disclosure time, and sends information for which the disclosure processing is to be executed, postponed, or cancelled, to the user-side transfer apparatus; and
the user-side transfer apparatus executes, postpones, or cancels the transmission of the disclosure data according to the information for which the disclosure processing is to be executed, postponed, or cancelled, received from the distribution server.

6. A transfer network system according to claim 5, wherein, when the user-side transfer apparatus receives the disclosure data and the disclosure time from the distribution server, the user-side transfer apparatus refers to the disclosure data table to compare with disclosure processing execution schedule made by another disclosure data and disclosure time already received, and responds disclosure processing possible/impossible information indicating that disclosure processing possible/impossible of the information is set impossible, when the disclosure time is identical or the disclosure time difference is smaller than a predetermined value.

7. A transfer network system according to claim 1,
wherein, when the user-side transfer apparatus receives the disclosure data and the disclosure time from the distribution server, the user-side transfer apparatus sends prior notice information that includes the disclosure time to the user equipment before the disclosure time; and
the user equipment makes in advance a preparation for receiving the disclosure data according to the prior notice information received.

8. A transfer network system according to claim 5,
wherein the user-side transfer apparatus sends prior notice information to the user equipment according to the disclosure data and the disclosure time received from the distribution server;
when the user equipment receives the prior notice information, the user equipment sends a prior notice reception response to the user-side transfer apparatus; and
the user-side transfer apparatus responds disclosure processing possible/impossible information indicating that disclosure processing possible/impossible of the information is set impossible, to the distribution server, when the prior notice reception response is not received within a predetermined period of time after the prior notice information is sent to the user equipment.

9. A transfer method in a transfer network system comprising:
a distribution server serving as a data distribution source transfer apparatus; and
a user-side transfer apparatus connected to distribution-destination user equipment;
the distribution server comprising:
a distribution data table that stores disclosure data, disclosure time, and distribution time in association with each other; and
a first time keeping function and a first time synchronization function for matching the time of the first time keeping function with a master clock;
the user-side transfer apparatus comprising:
a disclosure data table that stores disclosure data and disclosure time in association with each other; and
a second time keeping function and a second time synchronization function for matching the time of the second time keeping function with the master clock;
wherein
the distribution server referring to the time of the first time keeping function and the distribution data table to send in advance the disclosure data and the disclosure time at the distribution time to the user-side transfer apparatus;
the user-side transfer apparatus storing the disclosure data and the disclosure time received from the distribution server, in the disclosure data table; and
the user-side transfer apparatus referring to the disclosure data table to send the disclosure data to the user equipment when the time of the second time keeping function matches the disclosure time.

10. A transfer apparatus in a transfer network system that includes a distribution server serving as a data distribution source transfer apparatus and the transfer apparatus of user-side, the transfer apparatus being connected to distribution-destination user equipment, the transfer apparatus comprising:
a disclosure data table that stores disclosure data and disclosure time in association with each other; and
a second time keeping function and a second time synchronization function for matching the time of the second time keeping function with a master clock;
wherein,
when the distribution server refers to the time of a first time keeping function, which matches the master clock, and refers to a distribution data table that stores disclosure data, disclosure time, and distribution time in association with each other, to send in advance the disclosure data and the disclosure time at the distribution time to the transfer apparatus,
the transfer apparatus storing the disclosure data and the disclosure time received from the distribution server, in the disclosure data table; and
the transfer apparatus referring to the disclosure data table to send the disclosure data to the user equipment when the time of the second time keeping function matches the disclosure time.

11. A transfer method according to claim 9,
wherein information sent from the user-side transfer apparatus to the user equipment is divided into disclosure data for which disclosure processing is to be performed based on the disclosure time and general information that is sent to the user equipment from a transfer network to the user equipment without specifying time and that can be sent to the user equipment at any time; and the user-side transfer apparatus stops sending the general information before the disclosure time of the disclosure data, and restarts sending the general information after the disclosure data is sent at the disclosure time.

12. A transfer method according to claim 9,
wherein the distribution data table further stores destination user-side transfer apparatus information for each entry; and the distribution server receives from the user equipment a prior request that includes information identifying disclosure data, and user-side transfer apparatus information or user-equipment information;

stores the user-side transfer apparatus information or the user-equipment information in the destination user-side apparatus information of a corresponding entry in the distribution data table, according to the prior request; and refers to the distribution data table to determine the user-side transfer apparatus or the user equipment serving as the transmission destination of the disclosure data and the disclosure time, and sends the disclosure data and the disclosure time at the distribution time.

13. A transfer method according to claim 9,
wherein the distribution server sends the disclosure data and the disclosure time to the user-side transfer apparatus after encrypting the disclosure data and/or the disclosure time; and the user-side transfer apparatus decrypts the disclosure data and/or the disclosure time when receiving.

14. A transfer method according to claim 9,
wherein the distribution data table further stores destination user-side transfer apparatus information and reception response information for each entry;

the disclosure data table further stores disclosure processing possible/impossible information for each entry;

when the user-side transfer apparatus receives the disclosure data and the disclosure time from the distribution server, the user-side transfer apparatus determines whether disclosure processing is possible for the disclosure data and the disclosure time, stores disclosure processing possible/impossible information for a corresponding entry in the disclosure data table, and sends a response that includes the disclosure processing possible/impossible information to the distribution server;

the distribution server stores reception response information for a corresponding entry in the distribution data table, based on the response that includes the disclosure processing possible/impossible information, received from the user-side transfer apparatus, refers to the distribution data table to determine whether disclosure processing is to be executed, postponed, or cancelled according to one or more destination user-side transfer apparatus information and reception response information, corresponding to each disclosure data and disclosure time, and sends information for which the disclosure processing is to be executed, postponed, or cancelled, to the user-side transfer apparatus; and the user-side transfer apparatus executes, postpones, or cancels the transmission of the disclosure data according to the information for which the disclosure processing is to be executed, postponed, or cancelled, received from the distribution server.

15. A transfer method according to claim 9,
wherein, when the user-side transfer apparatus receives the disclosure data and the disclosure time from the distribution server, the user-side transfer apparatus sends prior notice information that includes the disclosure time to the user equipment before the disclosure time; and the user equipment makes in advance a preparation for receiving the disclosure data according to the prior notice information received.

\* \* \* \* \*